(12) United States Patent
Uchimura

(10) Patent No.: US 11,153,548 B2
(45) Date of Patent: Oct. 19, 2021

(54) REPRODUCTION APPARATUS, REPRODUCTION METHOD, PROGRAM, AND RECORDING MEDIUM

(71) Applicant: SONY CORPORATION, Tokyo (JP)

(72) Inventor: Kouichi Uchimura, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/758,661

(22) PCT Filed: Oct. 17, 2018

(86) PCT No.: PCT/JP2018/038587
§ 371 (c)(1),
(2) Date: Apr. 23, 2020

(87) PCT Pub. No.: WO2019/087775
PCT Pub. Date: May 9, 2019

(65) Prior Publication Data
US 2020/0358995 A1    Nov. 12, 2020

(30) Foreign Application Priority Data
Oct. 31, 2017   (JP) .............................. JP2017-210411

(51) Int. Cl.
*H04N 9/793* (2006.01)
*H04N 19/46* (2014.01)
*H04N 9/68* (2006.01)

(52) U.S. Cl.
CPC .............. *H04N 9/793* (2013.01); *H04N 9/68* (2013.01); *H04N 19/46* (2014.11)

(58) Field of Classification Search
CPC ........... H04N 9/793; H04N 9/68; H04N 19/46
See application file for complete search history.

(56) References Cited

U.S. PATENT DOCUMENTS

2018/0376194 A1* 12/2018 Oh ..................... H04N 21/4334
2021/0006689 A1*  1/2021 Yamamoto ............... H04N 5/20

FOREIGN PATENT DOCUMENTS

| JP | 2017-139052 A | 8/2017 |
|---|---|---|
| WO | WO 2015/198552 A1 | 12/2015 |
| WO | WO 2016/002154 A1 | 1/2016 |
| WO | WO 2016/125691 A1 | 8/2016 |

* cited by examiner

*Primary Examiner* — Michael E Teitelbaum
(74) *Attorney, Agent, or Firm* — Paratus Law Group, PLLC

(57) ABSTRACT

There is provided a reproduction apparatus, a reproduction method, a program, and a recording medium that can prevent an unnatural change in luminance in a case where other information is displayed by being superimposed on a video. A reproduction apparatus according to an aspect of the present technology receives a video stream to which dynamic metadata including luminance information of a picture has been added, and in a case where predetermined information is superimposed and displayed on the picture, adds metadata indicated by a flag indicating the metadata used for luminance adjustment while the predetermined information is superimposed and displayed to the picture constituting the received video stream, and outputs the picture to which the metadata has been added to a display apparatus. The present technology can be applied to a Blu-ray (registered trademark) Disc player.

18 Claims, 36 Drawing Sheets

FIG. 3

Dynamic metadata (SMPTE ST 2094)

```
1:  For(windows) {(max3)
2:    Window size, location
3:    Internal Ellipse size, location
4:    External Ellipse size, location
5:    Rotation angle(0-180)
6:    Overlap process option
7:    maxscl
8:    average max rgb
9:    Distribution max rgb percentages (max15)
10:   Distribution max rgb percentiles (max15)
11:   Fraction bright pixels
12:   Knee point
13:   Bezier curve anchors(max15)
14:   Color saturation weight
15: }
16: Target system display max luminance
17: Local display luminance(2×2-25×25)
18: Local mastering display luminance(2×2-25×25)
```

FIG. 15

| Syntax | No. of bits | Mnemonic |
|---|---|---|
| xxxxx.mpls{ | | |
|     type_indicator | 8*4 | bslbf |
|     version_number | 8*4 | bslbf |
|     PlayList_start_address | 32 | uimsbf |
|     PlayListMark_start_address | 32 | uimsbf |
|     ExtensionData_start_address | 32 | uimsbf |
|     reserved_for_future_use | 160 | bslbf |
|     AppInfoPlayList() | | |
|     for(i=0; i<N1; i++) { | | |
|         padding_word | 16 | bslbf |
|     } | | |
|     PlayList() | | |
|     for(i=0; i<N2; i++) { | | |
|         padding_word | 16 | bslbf |
|     } | | |
|     PlayListMark() | | |
|     for(i=0; i<N3; i++) { | | |
|         padding_word | 16 | bslbf |
|     } | | |
|     ExtensionData() | | |
|     for(i=0; i<N4; i++) { | | |
|         padding_word | 16 | bslbf |
|     } | | |
| } | | |

FIG. 16

| Syntax | No. of bits | Mnemonic |
|---|---|---|
| PlayList() { | | |
|   length | 32 | uimsbf |
|   reserved_for_future_use | 16 | bslbf |
|   number_of_PlayItems | 16 | uimsbf |
|   number_of_SubPaths | 16 | uimsbf |
|   for (PlayItem_id=0; | | |
|     PlayItem_id<number_of_PlayItems; | | |
|     PlayItem_id++) { | | |
|     PlayItem() | | |
|   } | | |
|   for (SubPath_id= 0; | | |
|     SubPath_id<number_of_SubPaths; | | |
|     SubPath_id++) { | | |
|     SubPath() | | |
|   } | | |
| } | | |

FIG. 17

| Syntax | No. of bits | Mnemonic |
|---|---|---|
| PlayItem() { | | |
|     length | 16 | uimsbf |
|     Clip_Information_file_name[0] | 8*5 | bslbf |
|     Clip_codec_identifier[0] | 8*4 | bslbf |
|     reserved_for_future_use | 11 | bslbf |
|     is_multi_angle | 1 | bslbf |
|     connection_condition | 4 | uimsbf |
|     ref_to_STC_id[0] | 8 | uimsbf |
|     IN_time | 32 | uimsbf |
|     OUT_time | 32 | uimsbf |
|     UO_mask_table() | | |
|     PlayItem_random_access_mode | 8 | uimsbf |
|     still_mode | 8 | uimsbf |
|     if(still_mode==0x1) { | | |
|         still_time | 16 | uimsbf |
|     } else { | | |
|         reserved | 16 | bslbf |
|     } | | |
|     if(is_multi_angle==1b) { | | |
|         number_of_angles | 8 | uimsbf |
|         reserved_for_future_use | 7 | bslbf |
|         is_seamless_angle_change | 1 | uimsbf |
|         for(angle_id = 1; //Note: angles after angle_id=1 | | |
|         angle_id<number_of_angles; angle_id++) { | | |
|             Clip_Information_file_name[angle_id] | 8*5 | bslbf |
|             Clip_codec_identifier[angle_id] | 8*4 | bslbf |
|             ref_to_STC_id[angle_id] | 8 | uimsbf |
|             reserved_for_future_use | 16 | bslbf |
|         } | | |
|     } | | |
|     STN_table() | | |
| } | | |

FIG. 18

| Syntax | No. of bits | Mnemonic |
|---|---|---|
| STN_table() { | | |
|     length | 16 | uimsbf |
|     reserved_for_future_use | 16 | bslbf |
|     number_of_video_stream_entries | 8 | uimsbf |
|     number_of_audio_stream_entries | 8 | uimsbf |
|     number_of_audio_stream2_entries | 8 | uimsbf |
|     number_of_PG_textST_stream_entries | 8 | uimsbf |
|     number_of_IG_stream_entries | 8 | uimsbf |
|     reserved_for_future_use | 64 | bslbf |
|     for (video_stream_id=0; | | |
|         video_stream_id < number_of_video_stream_entries; | | |
|         video_stream_id++) { | | |
|         stream_entry() | | |
|         stream_attribute() | | |
|     } | | |
|     for (audio_stream_id=0; | | |
|         audio_stream_id < number_of_audio_stream_entries; | | |
|         audio_stream_id++) { | | |
|         stream_entry() | | |
|         stream_attributes() | | |
|     } | | |
|     for (audio_stream_id2=0; | | |
|         audio_stream_id2 < number_of_audio_stream2_entries; | | |
|         audio_stream_id2++) { | | |
|         stream_entry() | | |
|         stream_attributes() | | |
|     } | | |
|     for (PG_textST_stream_id=0; | | |
|         PG_textST_stream_id < number_of_PG_textST_stream_entries; | | |
|         PG_textST_stream_id++) { | | |
|         stream_entry() | | |
|         stream_attribute() | | |
|     } | | |
|     for (IG_stream_id=0; | | |
|         IG_stream_id < number_of_IG_stream_entries; | | |
|         IG_stream_id++) { | | |
|         stream_entry() | | |
|         stream_attribute() | | |
|     } | | |
| } | | |

FIG. 19

| Syntax | No. of bits | Mnemonic |
|---|---|---|
| stream_attributes() { | | |
| length | 8 | uimsbf |
| stream_coding_type | 8 | bslbf |
| ... | | |
| if (stream_coding_type==0x91) { // Interactive Graphics stream | | |
| IG_language_code | 8*3 | bslbf |
| Fixed_Dynamic_medatada_during_PopUp_flag | 1 | bslf |
| reserved_for_future_use | 7 | bslbf |
| } else { | | |
| ... | | |
| } | | |
| } | | |

FIG. 27

| Syntax | No. of bits | Mnemonic |
|---|---|---|
| interactive_composition() { | | |
|   interactive_composition_length | 24 | uimsbf |
|   stream_model | 1 | bslbf |
|   user_interface_model | 1 | bslbf |
|   Fixed_Dynamic_metadata_during_PopUp_flag | 1 | bslbf |
|   reserved | 5 | bslbf |
|   If(stream_model == '0$_b$') { | | |
|     reserved | 7 | bslbf |
|     composition_time_out_pts | 33 | uimsbf |
|     reserved | 7 | bslbf |
|     selection_time_out_pts | 33 | uimsbf |
|   } | | |
|   user_time_out_duration | 24 | uimsbf |
|   number_of_pages | 8 | uimsbf |
|   for(i=0;i<number_of_pages;i++) { | | |
|     page() | | |
|   } | | |
| } | | |

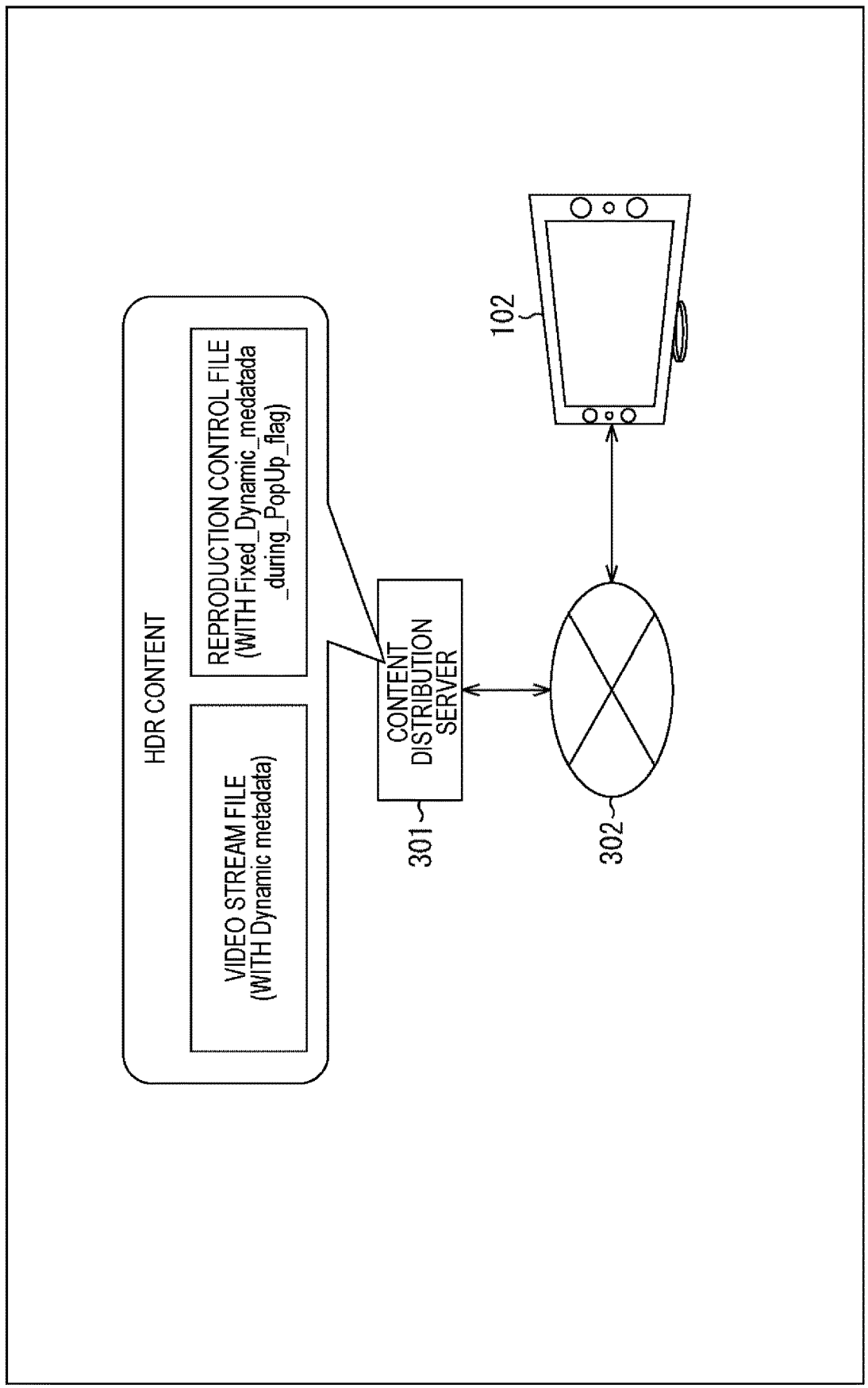

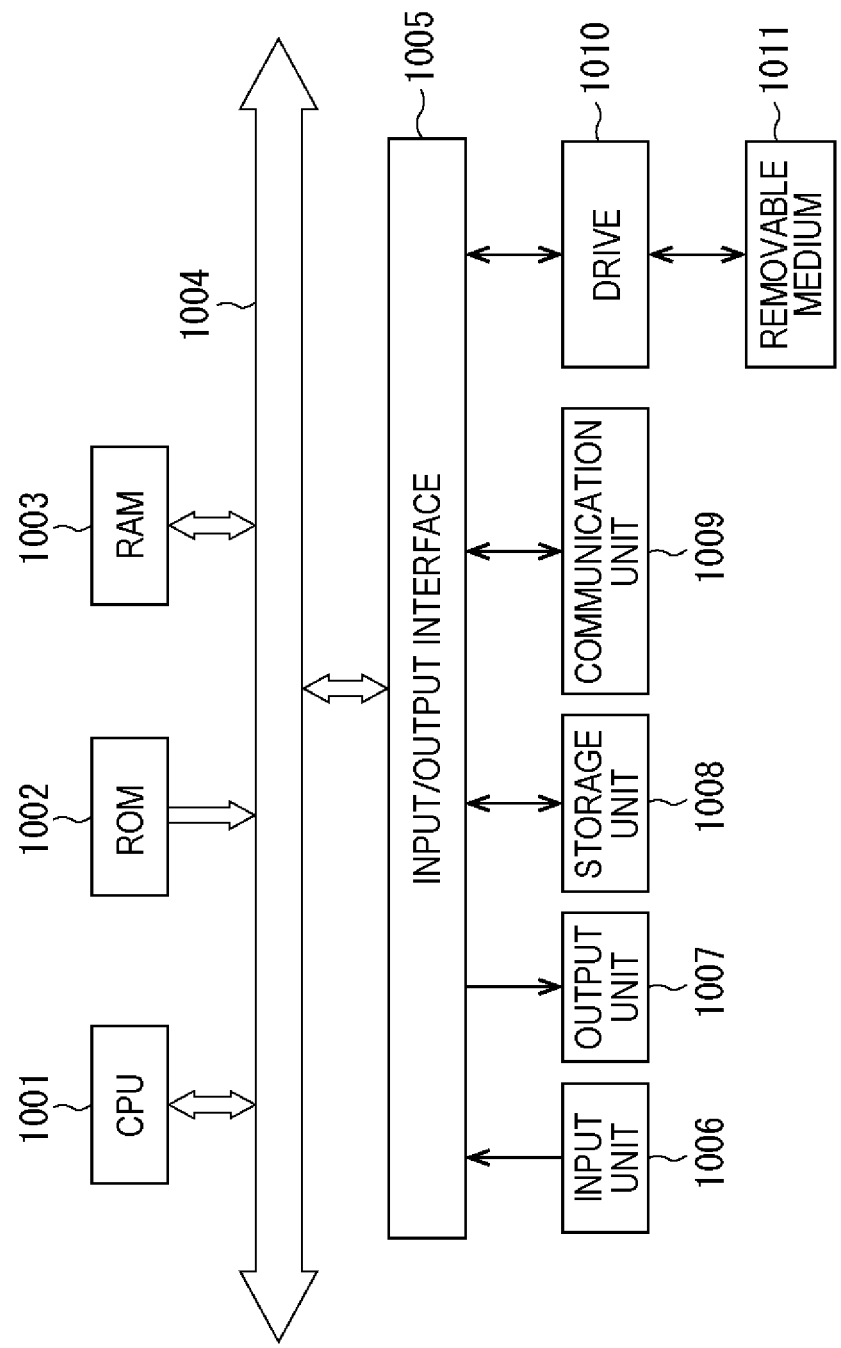

REPRODUCTION APPARATUS, REPRODUCTION METHOD, PROGRAM, AND RECORDING MEDIUM

CROSS REFERENCE TO PRIOR APPLICATION

This application is a National Stage Patent Application of PCT International Patent Application No. PCT/JP2018/038587 (filed on Oct. 17, 2018) under 35 U.S.C. § 371, which claims priority to Japanese Patent Application No. 2017-210411 (filed on Oct. 31, 2017), which are all hereby incorporated by reference in their entirety.

TECHNICAL FIELD

The present technology relates to a reproduction apparatus, a reproduction method, a program, and a recording medium, and particularly to a reproduction apparatus, a reproduction method, a program, and a recording medium that can prevent an unnatural change in luminance in a case where other information is displayed by being superimposed on a video.

BACKGROUND ART

Ultra HD Blu-ray (registered trademark) Disc (UHD BD) is a BD standard corresponding to recording of high dynamic range (HDR) video, which is a video with an extended dynamic range. While the maximum luminance of a standard dynamic range (SDR) video is 100 nits (100 $cd/m^2$), the maximum luminance of an HDR video exceeds that, for example, 10000 nits.

Dynamic metadata, which is metadata including luminance information in units of pictures (frames), is defined in SMPTE ST 2094 as metadata of an HDR video stream. At the time of reproduction of an HDR video stream to which Dynamic metadata has been added, the Dynamic metadata is transmitted from a player side to a TV side together with each picture.

On the TV side, in a case where the maximum luminance of the display is lower than the luminance of the HDR video, processing for compressing the luminance of the HDR video is performed on the basis of the Dynamic metadata transmitted from the BD player.

CITATION LIST

Patent Document

Patent Document 1: Japanese Patent Application Laid-Open No. 2017-139052

SUMMARY OF THE INVENTION

Problems to be Solved by the Invention

At the time of reproduction of the HDR video, the user may instruct to display a menu, subtitles, on screen display (OSD), or the like. For example, in a case where a menu display is instructed, in the BD player, a menu image is combined with each picture of the HDR video, and the HDR video combined with the menu image is output to the TV.

In a case where luminance compression using Dynamic metadata is performed on an HDR video in which a menu image is combined, the luminance of the menu image is also compressed together with the luminance of the HDR video. Therefore, for example, in a case where the display of the menu is instructed in a scene in which the luminance changes drastically, the luminance of the menu also changes drastically, which may give the user a sense of discomfort.

The present technology has been made in view of such a situation, and is intended to prevent an unnatural change in luminance in a case where another information is displayed by being superimposed on a video.

Solutions to Problem

A reproduction apparatus according to an aspect of the present technology includes: a receiving unit configured to receive a video stream to which dynamic metadata including luminance information of a picture is added; and an output control unit configured, in a case where predetermined information is superimposed and displayed on the picture, to add metadata indicated by a flag indicating the metadata used for luminance adjustment while the predetermined information is superimposed and displayed to the picture constituting the received video stream, and output the picture to which the metadata has been added to a display apparatus.

A recording medium according to another aspect of the present technology records: a first file of a video stream to which dynamic metadata including luminance information of a picture has been added; and a second file in which a flag indicating metadata used for luminance adjustment while superimposing and displaying predetermined information on the picture is described.

According to the present technology, a video stream to which dynamic metadata including luminance information of a picture has been added is received; and in a case where predetermined information is superimposed and displayed on the picture, metadata indicated by a flag indicating the metadata used for luminance adjustment while the predetermined information is superimposed and displayed is added to the picture constituting the received video stream; and the picture to which the metadata has been added is output to a display apparatus.

Effects of the Invention

According to the present technology, it is possible to prevent an unnatural change in luminance in a case where other information is displayed while being superimposed on a video.

Note that effects described herein are not necessarily limited, but may also be any of those described in the present disclosure.

BRIEF DESCRIPTION OF DRAWINGS

FIG. 3 is a diagram illustrating Dynamic metadata specified by SMPTE ST 2094-40.

FIG. 15 is a diagram illustrating the syntax of a PlayList file.

FIG. 16 is a diagram illustrating the syntax of PlayList ( ) of FIG. 15.

FIG. 17 is a diagram illustrating the syntax of PlayItem ( ) of FIG. 16.

FIG. 18 is a diagram illustrating the syntax of STN_table ( ) of FIG. 17.

FIG. 19 is a diagram illustrating an example of a description of stream_attributes ( ) regarding an IG stream.

FIG. 27 is a diagram illustrating the syntax of interactive_composition ( ).

FIG. 35 is a diagram illustrating a configuration example of still another reproduction system for HDR content.

FIG. 36 is a block diagram illustrating a configuration example of a computer.

MODE FOR CARRYING OUT THE INVENTION

Figure 1:
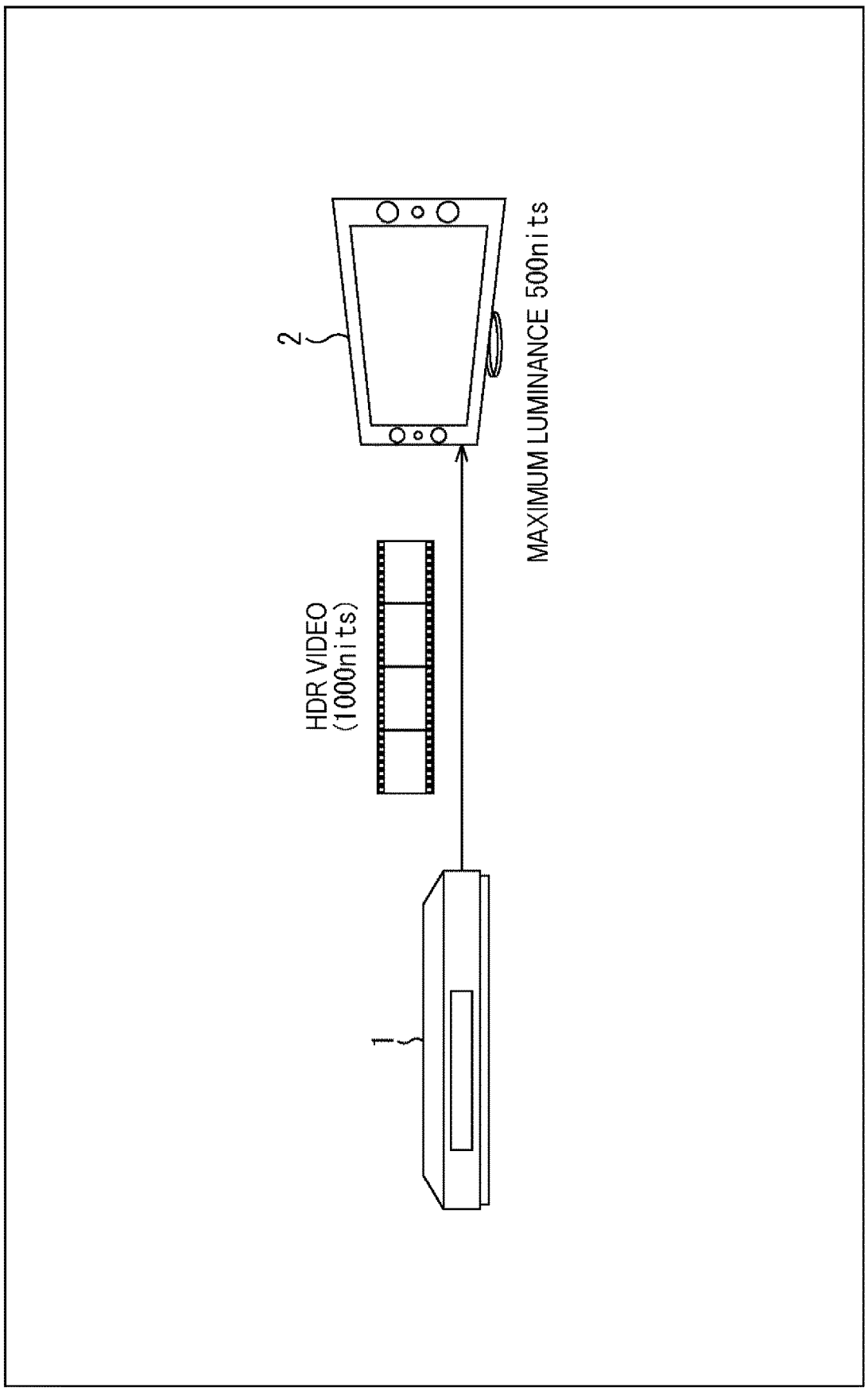
FIG. 1 is a diagram illustrating an example of the configuration of a reproduction system for HDR content.

Aspects for carrying out the present technology are described below. The description is provided in the order set forth below.

1. Metadata for HDR video
2. Change in luminance at the time of menu display
3. Menu display metadata
4. BD format
5. First Embodiment: Example of describing a flag in PlayList
6. Second Embodiment: Example of describing a flag in IG stream
7. Configuration and operation of other apparatuses
8. Other configuration example of reproduction system
9. Other example «1. Metadata for HDR Video»

FIG. 1 is a diagram illustrating an example of the configuration of a reproduction system for HDR content.

A reproduction system of FIG. 1 is configured such that a reproduction apparatus 1 and a TV (television receiver) 2 are connected by a cable of a predetermined standard such as high-definition multimedia interface (HDMI) (registered trademark) 2.0a or HDMI 2.1. The reproduction apparatus 1 and the TV 2 may be connected via a wireless interface.

The reproduction apparatus 1 is an apparatus that supports reproduction of HDR content, such as a UHD BD player. A BD on which HDR content is recorded is mounted on the drive of the reproduction apparatus 1. The content reproduced by the reproduction apparatus 1 includes audio data in addition to HDR video data.

The TV 2 has a function of receiving and displaying a program transmitted using a broadcast wave or a network as a transmission path, and a function of displaying a video input from the outside. The display device of the TV2 is a display corresponding to the display of the HDR video having a luminance exceeding 100 nits.

Before starting the transmission of the HDR content, for example, the reproduction apparatus 1 and the TV 2 perform transmission/reception of information associated with their performances to perform HDMI transmission setting (configuration). For example, the reproduction apparatus 1 notifies the TV 2 that HDR video is to be transmitted. Furthermore, the TV 2 notifies the reproduction apparatus 1 of the maximum luminance of the display of the TV 2.

After the transmission setting, the reproduction apparatus 1 decodes the HDR video stream read from the BD, and outputs each picture of the HDR video to the TV 2. The TV 2 receives and displays each picture transmitted from the reproduction apparatus 1.

At this time, the TV 2 appropriately performs processing of adjusting (compressing) the luminance of the HDR video transmitted from the reproduction apparatus 1 depending on the performance of the display. The luminance compression is performed in a case where the luminance of the HDR video output from the reproduction apparatus 1 is higher than the maximum luminance of the display of the TV 2.

In the example of FIG. 1, the luminance of the HDR video output from the reproduction apparatus 1 is 1000 nits, and the maximum luminance of the display of the TV 2 is 500 nits.

Figure 2:
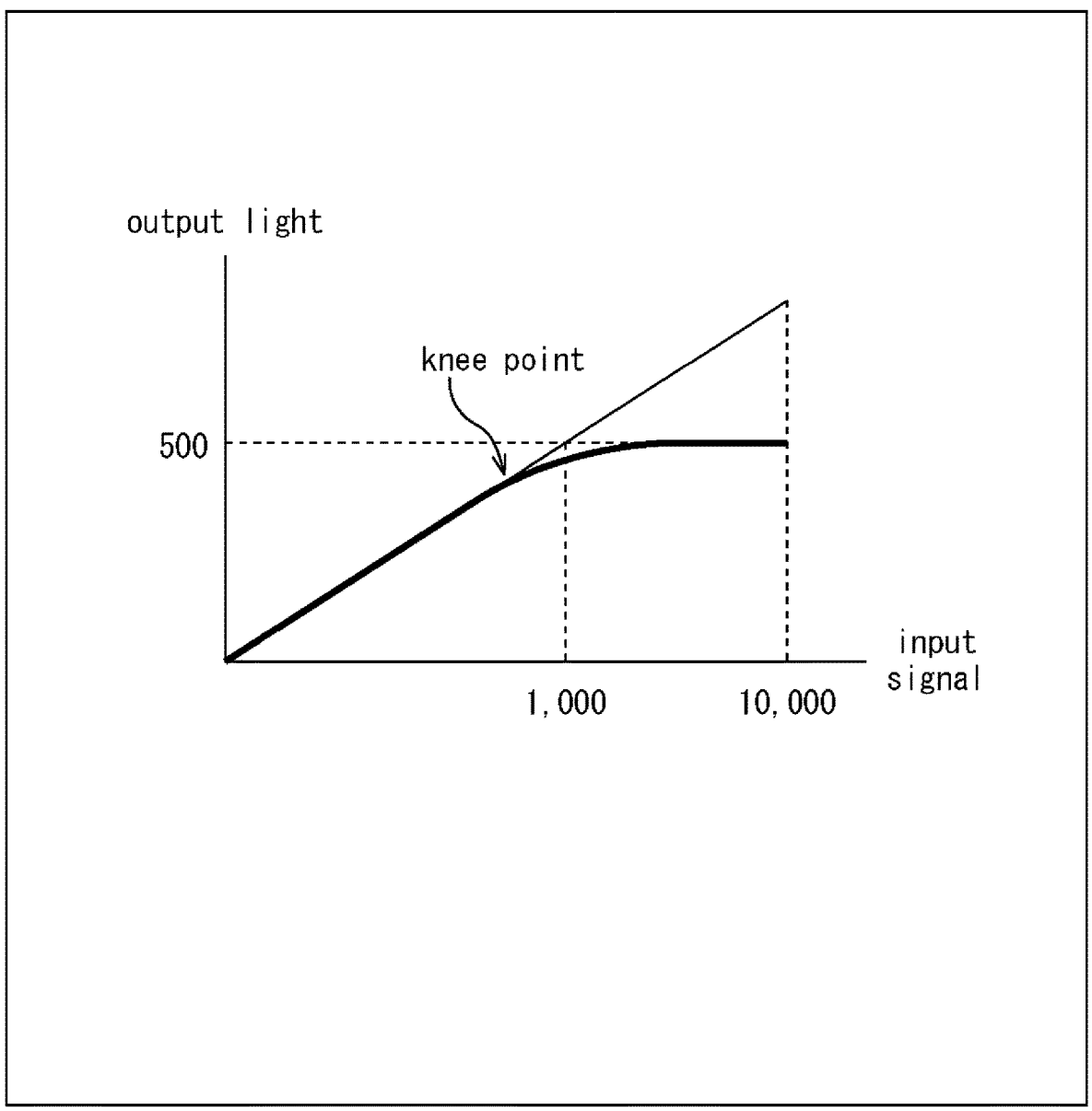
FIG. 2 is a diagram illustrating an example of a tone curve used for luminance compression of HDR video.

FIG. 2 is a diagram illustrating an example of a tone curve used for luminance compression of HDR video.

The horizontal axis in FIG. 2 indicates the luminance of the input signal, and the vertical axis indicates the luminance of the output (display). For example, electro-optical transfer function (EOTF) processing using a perceptual quantization (PQ) curve specified in SMPTE ST 2084 is performed on the TV 2 side, and the luminance of the HDR video is compressed to fall within the range of 500 nits, which is the maximum luminance of the display.

Note that the point at which the light and dark expression is not linear, indicated at the tip of the arrow in FIG. 2, is called a knee point.

As described above, in the reproduction system of FIG. 1, in a case where the display of the TV 2 does not have sufficient luminance with respect to the luminance of the luminance of the HDR video output from the reproduction apparatus 1, luminance compression is performed on the TV 2 side.

Metadata including the luminance information of the content is transmitted from the reproduction apparatus 1 to the TV 2 as auxiliary information for luminance compression. For example, Dynamic metadata is transmitted from the reproduction apparatus 1 to the TV 2.

Dynamic metadata is metadata that dynamically indicates luminance information of content in units of pictures, and is standardized as SMPTE ST 2094.

FIG. 3 is a diagram illustrating Dynamic metadata specified in SMPTE ST 2094-40.

As illustrated in the 1st line of FIG. 3, Dynamic metadata describes Window information set in the frame. Window is a rectangular region set in the frame. Up to three Windows can be set in one frame.

Each parameter illustrated in the 2nd to 14th lines is described for each Window set in the frame.

Window size and Window location indicate the size and location of the Window.

Internal Ellipse size and Internal Ellipse location indicate the size and location of the inner ellipse of the two ellipses set in the Window. An ellipse is set in the Window, and the luminance in the ellipse can be specified.

External Ellipse size and External Ellipse location indicate the size and location of the outer ellipse of the two ellipses set in the Window.

Rotation angle indicates the inclination of the two ellipses set in the Window.

The Overlap process option indicates a method for processing pixels in the ellipse.

The term maxscl indicates the RGB value of the brightest pixel in the Window.

The term average max rgb indicates the average of the largest value among R, G, and B of each pixel in the Window.

Distribution max rub percentages indicates the ranking of bright luminance in the Window by percentage.

Distribution max rgb percentiles indicates the ranking of bright luminance in the Window by rank (percentile).

Fraction bright pixels indicate the extent to which the maximum luminance value in the scene is output.

Knee point indicates the luminance value of the knee point described above.

Bezier curve anchors indicate samples x and y with luminance exceeding the knee point.

Color saturation weight indicates a value used for correcting an RGB value changed when luminance compression is performed on an assumed display (Target display).

Target System display max luminance indicates the luminance of the assumed display. The Target System display max luminance specifies that the content was created on the assumption that the content is displayed on such a display.

Local display luminance indicates the maximum luminance value of each area in a case where the display is divided into 2×2 to 25×25 areas.

Local mastering display luminance indicates the maximum luminance value of each area in a case where the mastering display is divided into 2×2 to 25×25 areas.

As described above, in the Dynamic metadata, the attributes of the frame (Window in the frame) are indicated by the parameters of the 1st to 15th lines. Furthermore, the parameters of the 16th and 17th lines indicate the attributes of the assumed display, and the parameters of the 18th line indicate the attributes of the display used to create the content.

Figure 4:
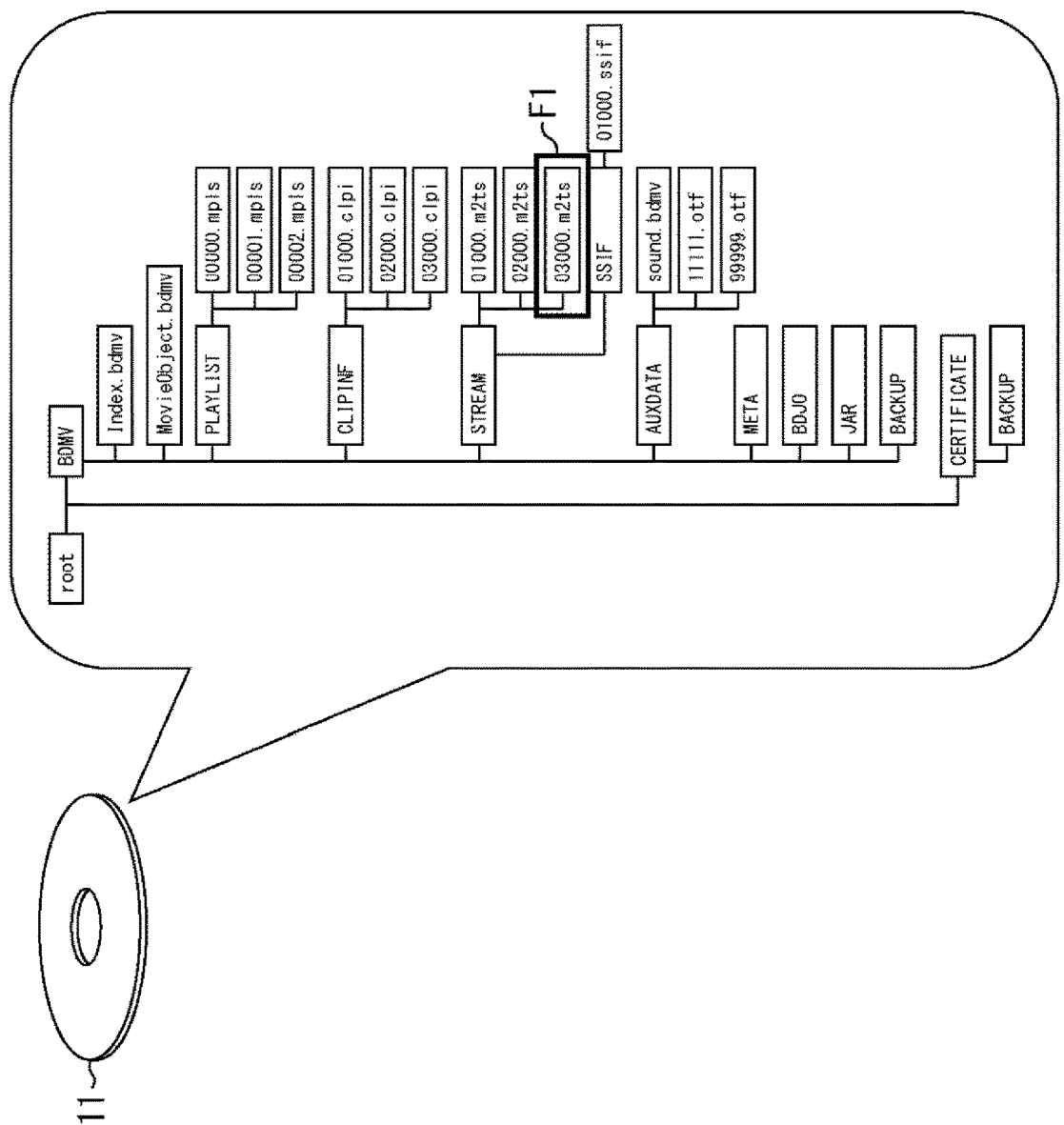
FIG. 4 is a diagram illustrating a file structure of a BD.

FIG. 4 is a diagram illustrating a file structure of a BD.

Although details will be described later, an AV stream file with an extension of m2ts is stored in a STREAM directory set under a BDMV directory.

The AV stream file is an MPEG-2 TS file obtained by multiplexing an HDR video stream, an audio stream, a subtitle stream, and the like with MPEG-2. In the example of FIG. 4, AV stream files "01000.m2ts", "02000.m2ts", and "03000.m2ts" are stored in the STREAM directory.

The HDR video stream is, for example, an encoded stream of high efficiency video coding (HEVC). Dynamic metadata is included in the HDR video stream as a HEVC supplemental enhancement information (SEI) message.

Figure 5:
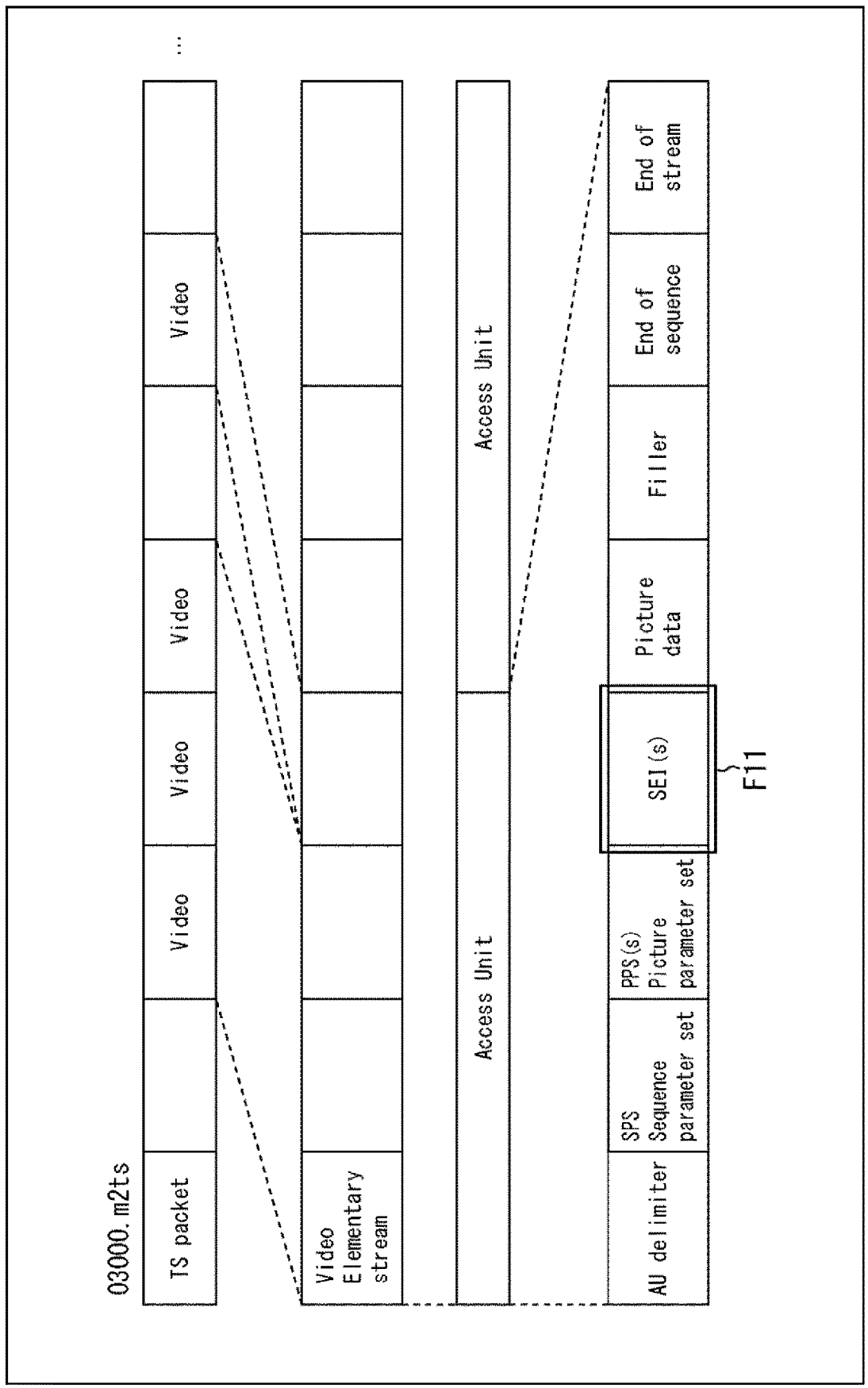
FIG. 5 is a diagram illustrating an example of the structure of an AV stream.

FIG. 5 is a diagram illustrating an example of the structure of an AV stream of "03000.m2ts" illustrated by being enclosed by a frame F1 in FIG. 4.

As illustrated at the top of FIG. 5, the AV stream of "03000.m2ts" includes a TS packet that stores data such as a video, an audio, and a subtitle. A Video Elementary stream is configured by collecting the TS packet of the video.

The Video Elementary stream includes a sequence of Access Units, and one Access Unit is data of one picture of the HDR video. Each Access Unit includes parameters such as SPS and PPS following an AU delimiter, and also includes an SEI message as illustrated by being enclosed by a frame F11.

The Dynamic metadata described above is included in the SEI message. Note that, following the SEI message, HDR video data is included as Picture data.

As described above, in the BD, the Dynamic metadata is included in the HDR video stream in the form of being added to each picture, and is multiplexed with the audio stream and the like.

Figure 6:
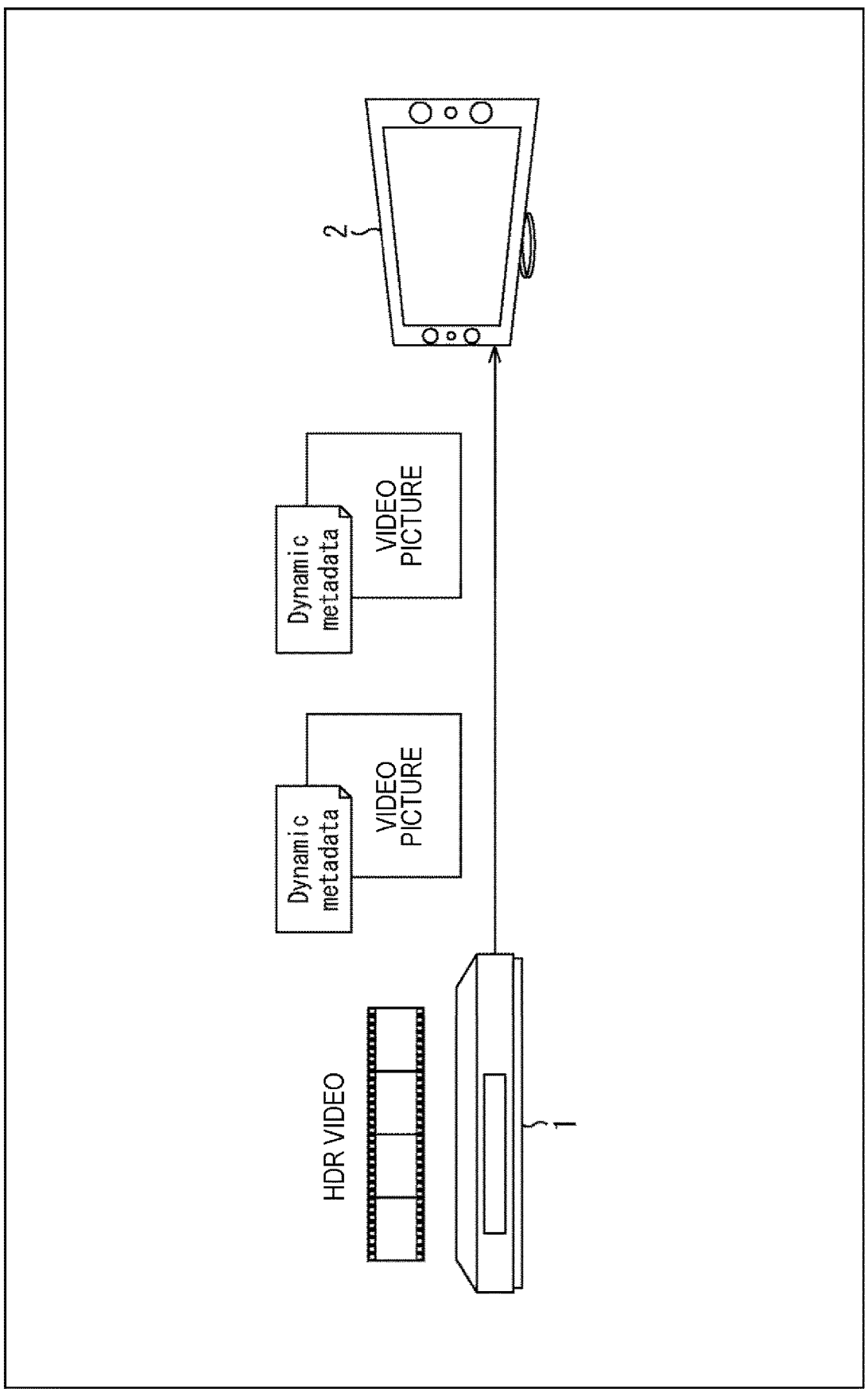
FIG. 6 is a diagram illustrating a transmission example of Dynamic metadata.

FIG. 6 is a diagram illustrating a transmission example of Dynamic metadata.

As illustrated in FIG. 6, the Dynamic metadata is transmitted from the reproduction apparatus 1 to the TV 2 in association with each picture obtained by decoding the HDR video stream. In the TV 2, luminance compression of each picture is performed on the basis of the Dynamic metadata transmitted together with each picture.

«2. Change in Luminance at the Time of Menu Display»

Figure 7:
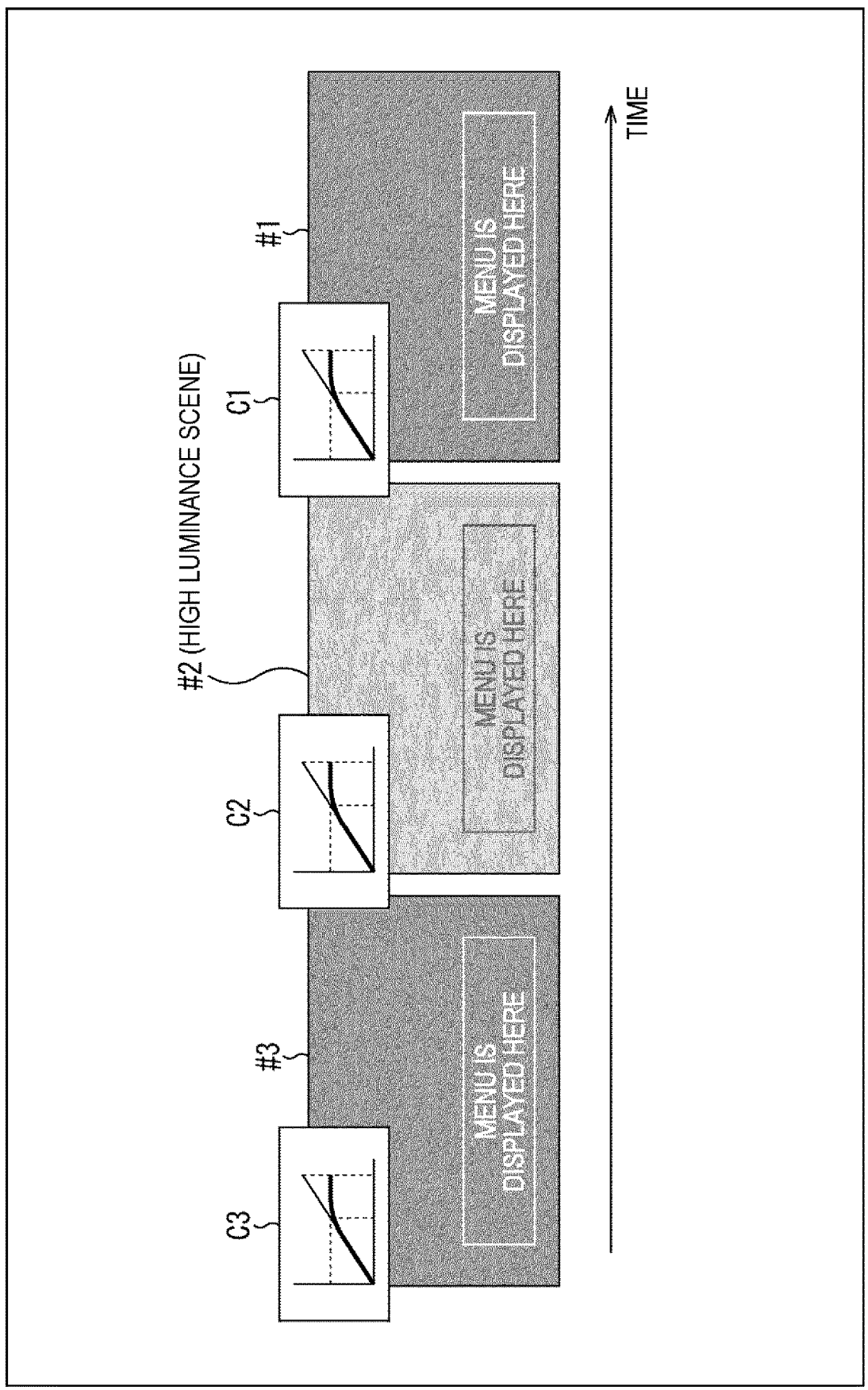
FIG. 7 is a diagram illustrating an example of luminance compression at the time of menu display.

FIG. 7 is a diagram illustrating an example of luminance compression at the time of menu display.

Note that, in the following, a case will be described where a menu is superimposed and displayed on an HDR video, and it is similar in a case where other information such as a subtitle and an OSD is superimposed and displayed on an HDR video.

The horizontal axis in FIG. 7 indicates time. Pictures are transmitted from the reproduction apparatus 1 to the TV 2 in the order of the pictures #1, #2, and #3, and the TV 2 performs luminance compression.

For example, a menu image is combined with each of the pictures #1, #2, and #3 in the reproduction apparatus 1 in response to a user's instruction to display a menu. In FIG. 7, the characters "Menu is displayed here" and a frame surrounding the characters, which are superimposed and displayed on the pictures #1, #2, and #3 indicate that an image constituting the menu, such as a button, has been combined in the area.

For example, it is assumed that picture #2 is a picture constituting a scene with higher luminance than the luminance of the pictures #1 and #3.

The luminance compression of the picture #1 in which the menu image is combined is performed on the basis of a tone curve C1 indicated by the Dynamic metadata transmitted together with the picture #1. The luminance compression of the picture #2 in which the menu image is combined is performed on the basis of a tone curve C2 indicated by the Dynamic metadata transmitted together with the picture #2. The luminance compression of the picture #3 in which the menu image is combined is performed on the basis of a tone curve C3 indicated by the Dynamic metadata transmitted together with the picture #3.

The tone curve C2 used for the luminance compression of the picture #2 constituting the high luminance scene strongly compresses the luminance as compared with the tone curve C1 used for the luminance compression of the picture #1 and the tone curve C3 used for the luminance compression of the picture #3. The luminance of the menu on the picture #2 is also compressed more strongly than the luminance of the menu on the pictures #1 and #3.

Therefore, in a case of comparing the appearance of the menu of each picture after the luminance compression, as illustrated in FIG. 7, the menu on the picture #2 is displayed with a lower luminance than the menu on the pictures #1 and #3. In FIG. 7, the menu on the picture #2 is illustrated with a lighter color, indicating that the luminance is lower than the luminance of the menus on the pictures #1 and #3.

In a case where the pictures #1 to #3 are displayed in order, the luminance of the menu is reduced by one step at the timing of the display of the picture #2, and an unnatural appearance is provided depending on the degree of luminance compression. For example, in a case where scenes having a large change in luminance continue, the menu looks blinking.

Figure 8:
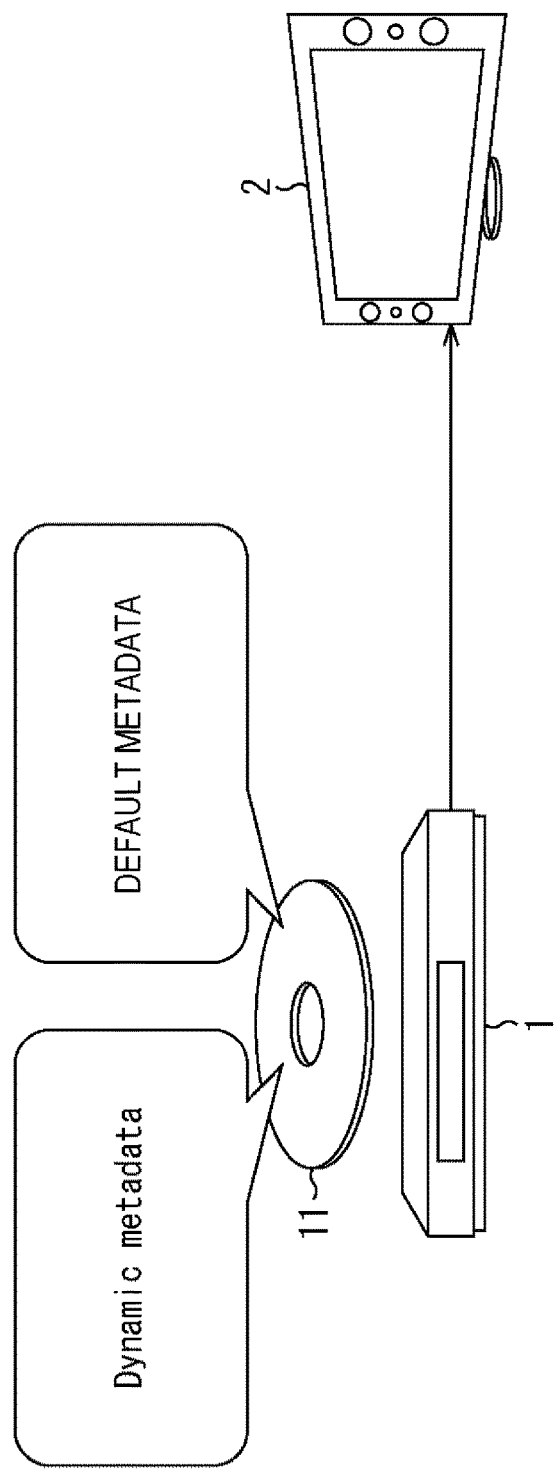
FIG. 8 is a diagram illustrating an example of metadata prepared on an optical disc.

FIG. 8 is a diagram illustrating an example of metadata prepared on an optical disc.

In order to prevent the above-mentioned unnatural appearance, it is conceivable to prepare default metadata, which is metadata for displaying a menu, on an optical disc 11, as illustrated in FIG. 8. The optical disc 11 is a BD.

The default metadata is, for example, metadata including parameters similar to the parameters of the Dynamic metadata described with reference to FIG. 3. A fixed value is set for each parameter. While the value of the parameter included in the Dynamic metadata is a value that gives priority to the appearance of the video, the value of the parameter included in the default metadata is, for example, a value that gives priority to the appearance of the menu.

In a case where the reproduction of the HDR content is started, the reproduction apparatus 1 outputs Dynamic metadata in association with each picture obtained by decoding the HDR video stream.

Furthermore, in a case where the display of the menu is instructed, the reproduction apparatus 1 combines the menu image with each picture obtained by decoding the HDR video stream, associates the default metadata with the picture combined with the menu image, and output it.

In the TV 2, luminance compression using default metadata is performed on the picture obtained by combining the menu image, and the picture after the luminance compression is displayed. The luminance of the menu is also compressed according to a tone curve indicated by the default metadata.

Since the value of the parameter included in the default metadata is a fixed value, the luminance of the menu is constant regardless of the luminance of the picture associated with the default metadata.

Figure 9:
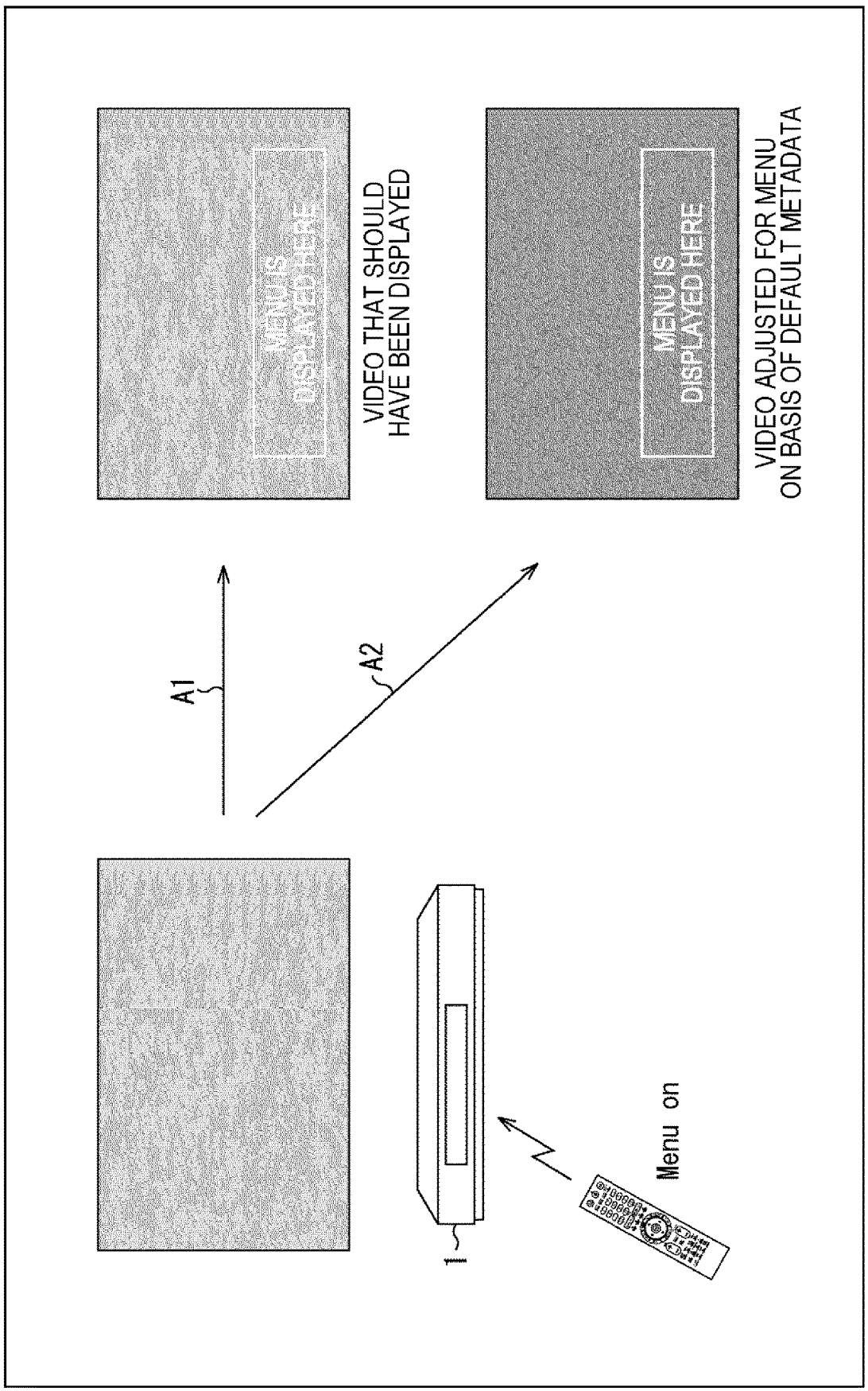
FIG. 9 is a diagram illustrating display after luminance compression.

FIG. 9 is a diagram illustrating display after luminance compression.

For example, in a case where a menu display is instructed in a state where a scene with high luminance is being displayed as illustrated on the left side of FIG. 9, luminance compression using the default metadata instead of the Dynamic metadata is performed, and the luminance of the HDR video becomes low as indicated at the tip of the arrow A2. That is, assuming that the luminance after luminance compression using the Dynamic metadata is the actual luminance of the HDR video indicated at the tip of the arrow A1, an HDR video darker than the actual luminance is displayed.

Since the metadata for which a value for the menu is set, the luminance of the menu becomes suitable as indicated at the tip of the arrow A2 by the luminance compression using the default metadata.

In the case of the processing described with reference to FIG. 7, luminance compression for the video is performed on the menu and the menu is darkened, so to speak, under the influence of the luminance compression of the video.

On the other hand, in the case of the processing using the default metadata described with reference to FIGS. 8 and 9, the luminance compression for the menu is performed on the video, and the video is darkened, so to speak, under the influence of the luminance compression of the menu. In some cases, the unnatural appearance can be reduced when the luminance of the video is maintained by the luminance compression for the video, rather than by darkening the video by luminance compression for the menu, e.g., when the size of the menu is small.

In the present technology, in a case where the menu is displayed, the creator of the content can specify whether to perform luminance compression using the Dynamic metadata or to perform luminance compression using metadata for menu display.

«3. Menu Display Metadata»

Figure 10:
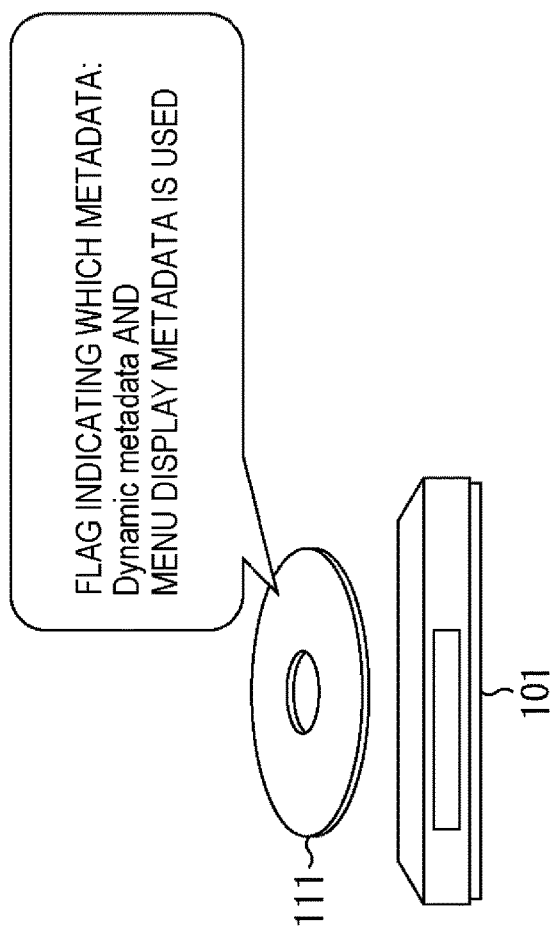
FIG. 10 is a diagram illustrating a reproduction apparatus according to an embodiment of the present technology.

FIG. 10 is a diagram illustrating a reproduction apparatus 101 according to an embodiment of the present technology and an optical disc 111 mounted on the reproduction apparatus 101.

Figure 11:
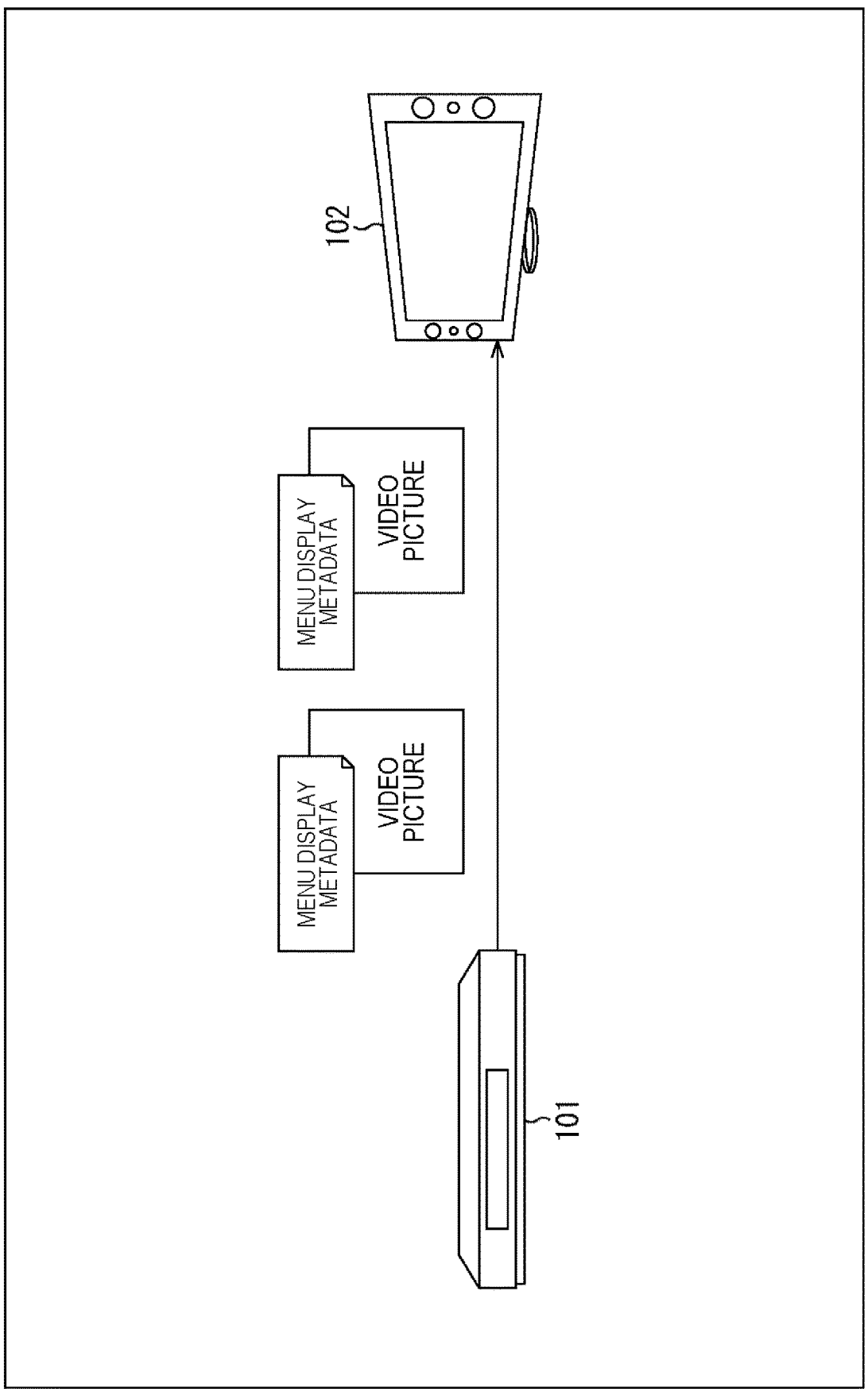
FIG. 11 is a diagram illustrating a transmission example of metadata.

The reproduction apparatus 101 is a player corresponding to the reproduction apparatus 1 of FIG. 1. A TV 102 corresponding to the TV 2 is connected to the reproduction apparatus 101 via an HDMI cable or the like (FIG. 11). A description overlapping with the above description will be omitted as appropriate.

As illustrated in the balloon in FIG. 10, a flag indicating which metadata: Dynamic metadata or menu display metadata is used for adjusting the luminance on the TV side while displaying the menu is recorded on the optical disc 111.

The menu display metadata is metadata corresponding to the default metadata in FIG. 8, and has, for example, parameters similar to the parameters of the Dynamic metadata. A fixed value is set for each parameter of the menu display metadata. The menu display metadata is prepared in the reproduction apparatus 101 in advance, for example, in the form of being stored in a memory in the reproduction apparatus 101.

The optical disc 111 is similar to the above-described optical disc 11 except that a flag indicating metadata used for luminance adjustment is recorded. On the optical disc 111, each data including the HDR video stream is recorded, for example, in a BD-ROM format.

The reproduction apparatus 101 in FIG. 10 performs processing similar to the above-described processing of the reproduction apparatus 1 with reference to the value of the flag indicating the metadata used for the luminance adjustment.

FIG. 11 is a diagram illustrating a transmission example of metadata.

For example, in a case where the menu display is instructed in a state where the HDR video is displayed on the TV 102, the reproduction apparatus 101 refers to the value of the flag and specifies which meta data to use: the Dynamic metadata and the menu display metadata.

In a case where the use of menu display metadata is indicated by the flag, the reproduction apparatus 101 combines the menu image with each picture of the HDR video, and as illustrated in FIG. 11, outputs the menu display metadata in association with the picture combined with the menu image.

In the TV 102 the luminance compression of each picture is performed on the basis of the display metadata transmitted together with each picture, and the HDR video after the luminance compression is displayed. The display displays a menu superimposed on the HDR video.

Since the display metadata is metadata in which a fixed value is set for each parameter, the luminance of the menu superimposed on the HDR video after the luminance compression using the display metadata is constant.

On the other hand, in a case where the use of Dynamic metadata is indicated by the flag, the reproduction apparatus 101 combines the menu image with each picture of the HDR video, and associates the Dynamic metadata with the picture combined with the menu image and outputs the resulting picture.

In the TV 102, the luminance compression of each picture is performed on the basis of the Dynamic metadata transmitted together with each picture, and the HDR video after the luminance compression is displayed. The display displays a menu superimposed on the HDR video.

Note that, similarly, in a case where the menu display is not instructed, the picture associated with the Dynamic metadata is output from the reproduction apparatus 101 to the TV 102 as described with reference to FIG. 6. In the TV 102, luminance compression of each picture is performed on the basis of the Dynamic metadata transmitted in association with each picture.

As described above, the content creator can specify, using the flag, which metadata to use to perform luminance compression: the Dynamic metadata and the menu display metadata in a case of displaying the menu.

A series of processing of the reproduction apparatus 101 described above will be described later with reference to a flowchart.

«4. BD Format»

<4-1. Data Management Structure>

Figure 12:
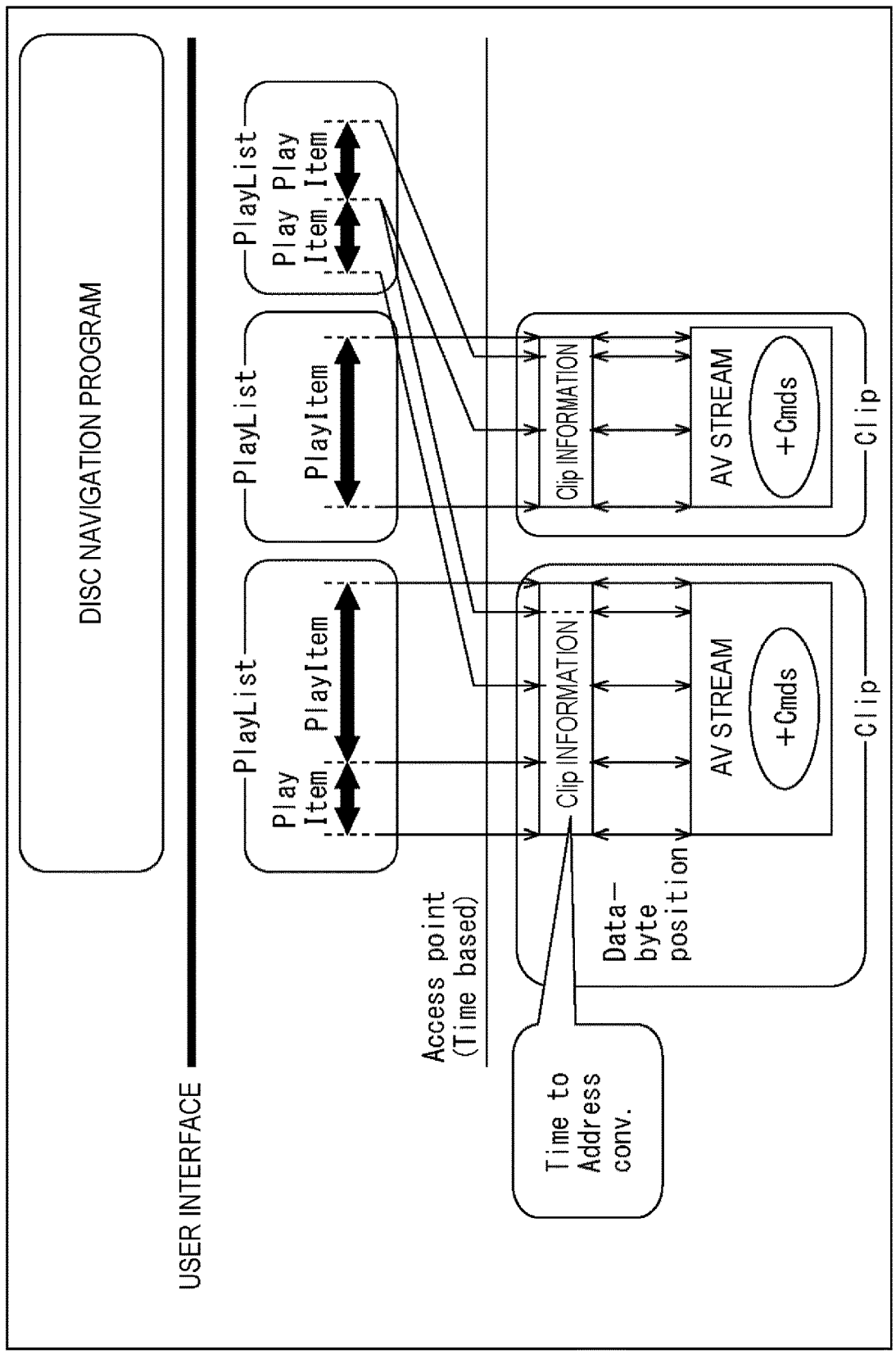
FIG. 12 is a diagram illustrating an example of a management structure of an AV stream in a BD-ROM format.

FIG. 12 is a diagram illustrating an example of a management structure of an AV stream in a BD-ROM format.

The management of the AV stream is performed using two layers, PlayList and Clip. The AV stream can be recorded not only on the optical disc 111 but also on the local storage of the reproduction apparatus 101.

A pair of one AV stream and Clip Information that is information accompanying the AV stream is managed as one object. A pair of an AV stream and Clip Information is called a Clip.

The AV stream is developed on the time axis, and the access point of each Clip is specified in the PlayList mainly by a time stamp. Clip Information is used to find an address in the AV stream where decoding is to be started, for example.

PlayList is a group of reproduction sections of the AV stream. One reproduction section in the AV stream is called PlayItem. PlayItem is indicated by a pair of an IN point and an OUT point of a reproduction section on the time axis. As illustrated in FIG. 12, the PlayList includes one or more PlayItems.

The first PlayList from the left in FIG. 12 includes two PlayItems, and the two PlayItems refer to the first half and the second half of the AV stream included in the left Clip.

The second PlayList from the left includes one PlayItem, which refers to the entire AV stream included in the right Clip.

The third PlayList from the left includes two PlayItems, and the two PlayItems refer to a part of the AV stream included in the left Clip and a part of the AV stream included in the right Clip, respectively.

For example, in a case where the left PlayItem included in the first PlayList from the left is specified by a disc navigation program as reproduction target, the first half of the AV stream included in the left Clip referenced by the PlayItem is reproduced.

In the PlayList, a reproduction path created by an arrangement of one or more PlayItems is called a main path (Main Path). Furthermore, a reproduction path created by an arrangement of one or more SubPlayItems in parallel with the Main Path in the PlayList is called a sub path (Sub Path).

Figure 13:
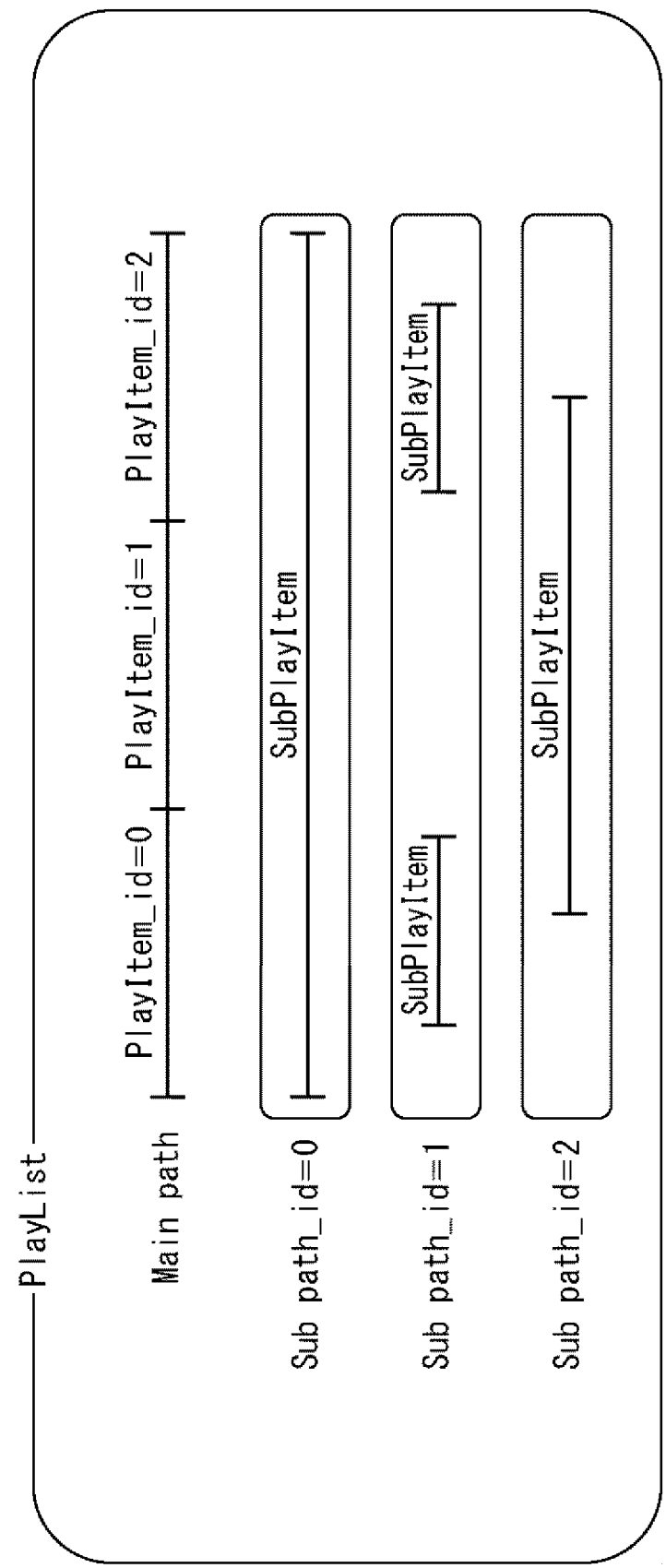
FIG. 13 is a diagram illustrating the structures of a Main Path and a Sub Path.

FIG. 13 is a diagram illustrating the structures of a Main Path and a Sub Path.

PlayList has one Main Path and one or more Sub Paths. The PlayList of FIG. 13 has one Main Path and three Sub Paths created by an arrangement of three PlayItems.

IDs are set to PlayItems constituting the Main Path in order from the beginning. The IDs of Subpath_id=0, Subpath_id=1, and Subpath_id=2 are also set in the Sub Path in order from the beginning.

In the example of FIG. 13, the Sub Path of Subpath_id=0 includes one SubPlayItem, and the Sub Path of Subpath_id=1 includes two SubPlayItems. Furthermore, one SubPlayItem is included in the Sub Path of Subpath_id=2.

The AV stream referred to by one PlayItem includes at least a video stream. The AV stream may or may not include one or more audio streams reproduced at the same timing (synchronously) as the video stream included in the AV stream.

The AV stream may or may not include one or more bitmap subtitle (presentation graphic (PG)) streams reproduced in synchronization with the video stream included in the AV stream.

The AV stream may or may not include one or more interactive graphic (IG) streams reproduced in synchronization with the video stream included in the AV stream file. The IG stream is used to display a graphic such as a button operated by a user.

In the AV stream referred to by one PlayItem, a video stream and an audio stream, a PG stream, and an IG stream that are reproduced in synchronization with the video stream are multiplexed.

Furthermore, one SubPlayItem refers to a video stream, an audio stream, a PG stream, or the like of a stream different from the AV stream referred to by the PlayItem.

Among the information superimposed on the HDR video as described above, the menu is acquired by, for example, decoding an IG stream. Furthermore, subtitles are acquired, for example, by decoding a PG stream.

Thus, the reproduction of the AV stream is performed using the PlayList and the Clip Information. PlayList and Clip Information, which are reproduction control information used to manage the reproduction of an AV stream as content, are appropriately referred to as Data Base information.

<4-2. Directory Structure>

Figure 14:
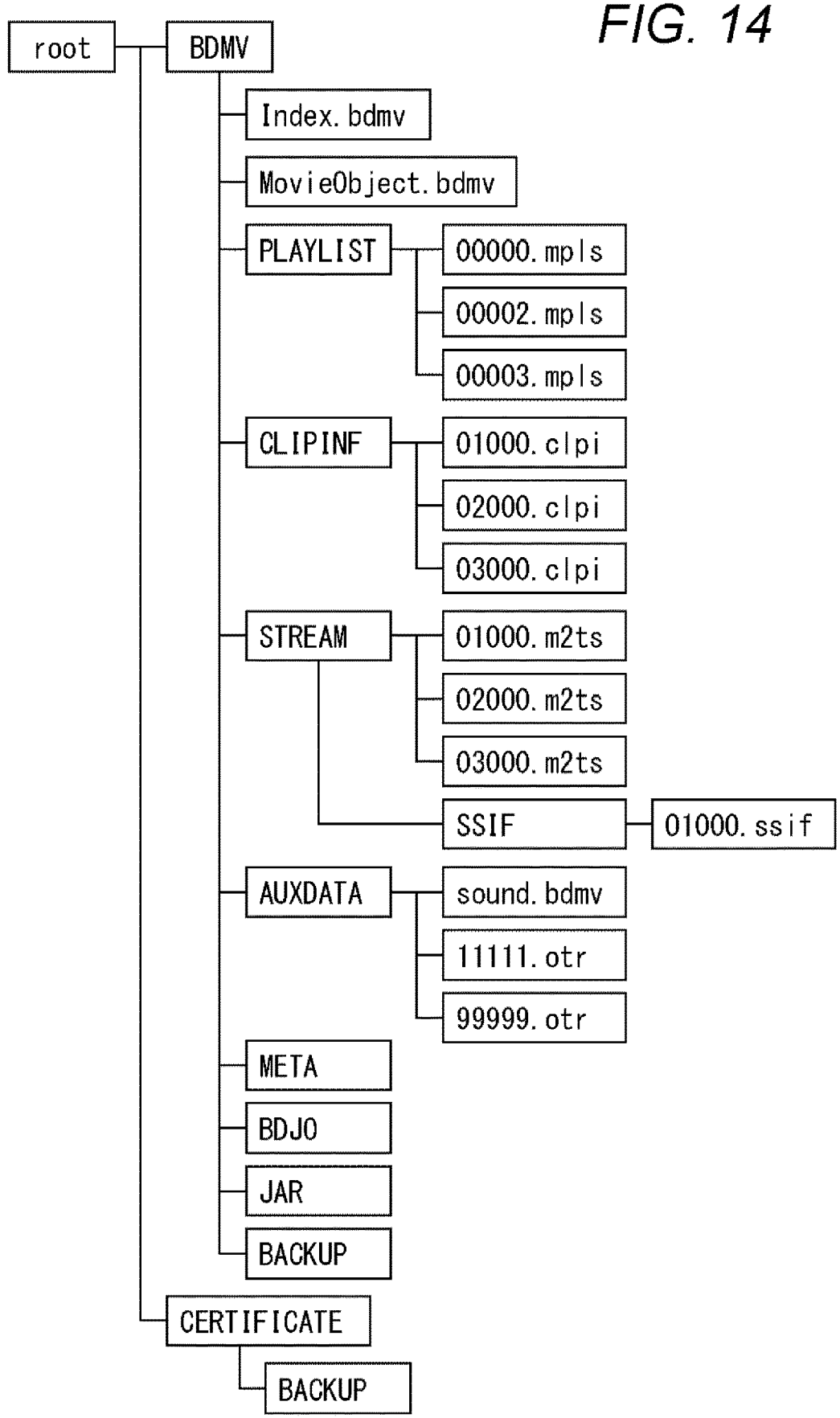
FIG. 14 is a diagram illustrating an example of a file management structure.

FIG. 14 is a diagram illustrating an example of management structure of a file recorded on the optical disc 111.

Each file recorded on the optical disc 111 is hierarchically managed by a directory structure. One root directory is created on the optical disc 111.

A BDMV directory is placed below the root directory.

Under the BDMV directory, an Index table file that is a file with the name "Index.bdmv" and a MovieObject file that is a file with the name "MovieObject.bdmv" are stored. An Index table is described in the Index table file.

Under the BDMV directory, a PLAYLIST directory, a CLIPINF directory, a STREAM directory, and the like are provided.

The PLAYLIST directory stores PlayList files describing PlayLists. Each PlayList file is set with a name obtained by combining a five-digit number and an extension ".mpls". In the three PlayList files illustrated in FIG. 14, file names "00000.mpls", "00001.mpls" and "00002.mpls" are set.

The Clip Information file is stored in the CLIPINF directory. Each Clip Information file is set with a name obtained by combining a five-digit number and an extension ".clpi". In the three Clip Information files of FIG. 14, file names "01000.clpi", "02000.clpi", and "03000.clpi" are set, respectively.

The above-mentioned AV stream file is stored in the STREAM directory. Each AV stream file is set with a name obtained by combining a five-digit number and an extension ".m2ts". File names "01000.m2ts", "02000.m2ts", and "03000.m2ts" are set for the three AV stream files in FIG. 14, respectively.

The Clip Information file and the AV stream file in which the same five-digit number is set in the file name are files that constitute one Clip. When reproducing the AV stream file of "01000.m2ts", the Clip Information file of "01000.clpi" is used, and when reproducing the AV stream file of "02000.m2ts", the Clip Information file of "02000.clpi" is used.

«5. First Embodiment: Example of Describing a Flag in PlayList»

<5-1. PlayList Description>

The main description of the description included in the PlayList will be described.

FIG. 15 is a diagram illustrating the syntax of a PlayList file.

The PlayList file is a file stored in the PLAYLIST directory in FIG. 14 and having the extension ".mpls".

AppInfoPlayList ( ) stores parameters related to PlayList reproduction control, such as reproduction restrictions.

PlayList ( ) stores parameters related to Main Path and Sub Path.

PlayListMark ( ) stores mark information of the PlayList, that is, information associated with a mark that is a jump destination (jump point) in a user operation, a command, or the like, for instructing a chapter jump or the like.

FIG. 16 is a diagram illustrating the syntax of PlayList ( ) of FIG. 15.

The term number_of_PlayItems indicates the number of PlayItems in the PlayList. In the case of the example of FIG. 13, the number of PlayItems is three. The value of PlayItem_id is assigned from 0 in the order in which PlayItem ( ) appears in the PlayList.

The term number_of_SubPaths indicates the number of Sub Paths in the PlayList. In the case of the example of FIG. 13, the number of Sub Paths is three. The value of SubPath_id is assigned from 0 in the order in which SubPath ( ) appears in the PlayList.

As illustrated in FIG. 16, PlayList ( ) describes PlayItem ( ) by the number of PlayItems and SubPath ( ) by the number of Sub Paths.

FIG. 17 is a diagram illustrating the syntax of PlayItem ( ) of FIG. 16.

Clip_Information_file_name [0] indicates the name of the Clip Information file of the Clip referenced by the PlayItem. Clip_codec_identifier [0] indicates the codec method of the Clip.

IN_time indicates the start position of the reproduction section of PlayItem, and OUT_time indicates the end position. After OUT_time, UO_mask_table ( ), PlayItem_random_access_mode, and still_mode are included.

STN_table ( ) includes attribute information of each Elementary stream that constitutes the AV stream referred to by PlayItem. In a case where there is a Sub Path to be reproduced in association with the PlayItem, STN_table ( ) (also includes information of the attribute of each Elementary stream constituting the AV stream referenced by the SubPlayItem constituting the Sub Path.

FIG. 18 is a diagram illustrating the syntax of STN_table ( ) of FIG. 17.

The term number_of_video_stream_entries indicates the number of video streams that are entered (registered) in STN_table ( ). The term number_of_audio_stream_entries indicates the number of 1st audio streams entered in STN_table ( ). The term number_of_audio_stream2_entries indicates the number of 2nd audio streams entered in STN_table ( ).

The term number_of_PG_textST_stream_entries indicates the number of PG_textST streams entered in STN_table ( ). The PG_textST stream is a presentation graphics (PG) stream in which bitmap subtitles are run-length encoded and a text subtitle file (textST). The term number_of_IG_stream_entries indicates the number of interactive graphics (IG) streams entered in STN_table ( ).

STN_table ( ) describes stream_entry ( ) and stream_attributes ( ), which are information of each video stream, 1st audio stream, 2nd audio stream, PG_textST stream, and IG stream. The term stream_entry ( ) contains the PID of the stream, and stream_attributes ( ) contains the attribute information of the stream.

FIG. 19 is a diagram illustrating an example of a description of stream_attributes ( ) regarding an IG stream. As described above, the IG stream is a stream used for transmitting menu data.

In a case where the value of stream_coding_type is 0x91, information associated with the IG stream is described in stream_attributes ( ). For example, as illustrated in FIG. 19, IG_language_code and Fixed_Dynamic_metadata_during_PopUp_flag, which is a 1-bit flag, are described in stream_attributes ( ).

Fixed_Dynamic_metadata_during_PopUp_flag is a flag (flag in FIG. 10) indicating metadata used for luminance adjustment while displaying a menu on the basis of the IG stream.

For example, the value of Fixed_Dynamic_metadata_during_PopUp_flag being 0b indicates that Dynamic metadata is used for luminance adjustment. Furthermore, the value of Fixed_Dynamic_metadata_during_PopUp_flag being 1b indicates that menu display metadata is used for luminance adjustment.

The value of Fixed_Dynamic_metadata_during_PopUp_flag being 0b may indicate that menu display metadata is used for luminance adjustment, and 1b may indicate that the Dynamic metadata is used for luminance adjustment.

As described above, in the stream_attributes ( ) related to the IG stream in the STN_table ( ) of the PlayList file, the flag indicating the metadata used for adjusting the luminance while displaying the menu is described.

<5-2. Configuration of the Reproduction Apparatus>

Here, the configuration of the reproduction apparatus 101 will be described.

Figure 20:
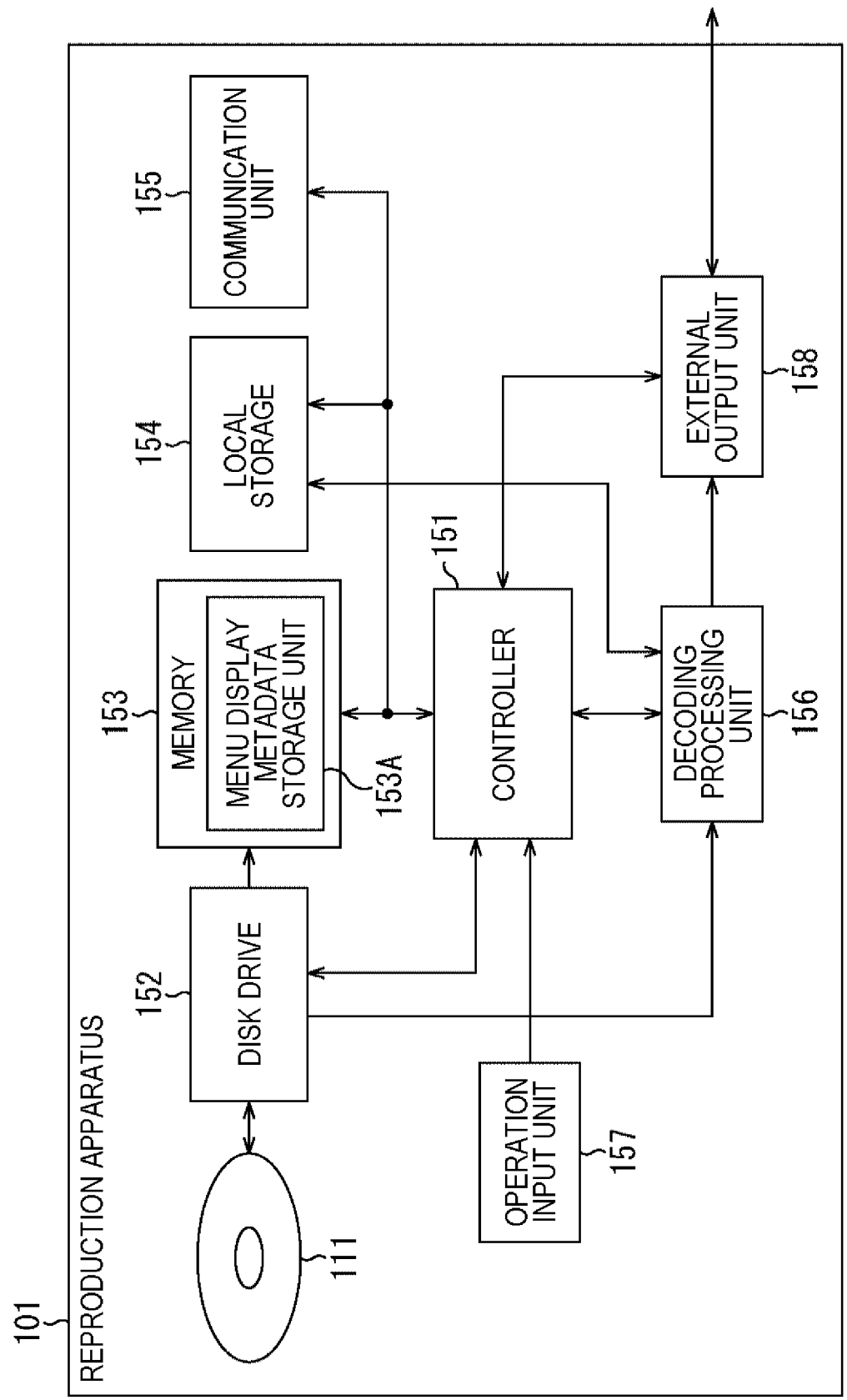
FIG. 20 is a block diagram illustrating a configuration example of a reproduction apparatus.

FIG. 20 is a block diagram illustrating a configuration example of the reproduction apparatus 101.

The reproduction apparatus 101 includes a controller 151, a disk drive 152, a memory 153, a local storage 154, a communication unit 155, a decoding processing unit 156, an operation input unit 157, and an external output unit 158.

The controller 151 includes a central processing unit (CPU), a read only memory (ROM), a random access memory (RAM), and the like. The controller 151 executes a predetermined program and controls the overall operation of the reproduction apparatus 101.

The disk drive 152 reads data recorded on the optical disc 111 and outputs the data to the controller 151, the memory 153, or the decoding processing unit 156. For example, the disk drive 152 outputs Data Base information read from the optical disc 111 to the controller 151, and outputs an AV stream to the decoding processing unit 156.

The memory 153 stores data necessary for the controller 151 to execute various types of processing, such as a program executed by the controller 151. In the memory 153, a menu display metadata storage unit 153A is formed.

The menu display metadata storage unit 153A stores menu display metadata. The menu display metadata stored in the menu display metadata storage unit 153A is appropriately used in accordance with the value of Fixed_Dynamic_metadata_during_PopUp_flag.

The local storage 154 includes a recording medium such as a hard disk drive (HDD) or a solid state drive (SSD). In the local storage 154, a stream or the like downloaded from the server is recorded.

The communication unit 155 is an interface such as a wireless LAN or a wired LAN. For example, the communication unit 155 communicates with the server via a network such as the Internet, and supplies data downloaded from the server to the local storage 154.

The decoding processing unit 156 decodes the HDR video stream multiplexed with the AV stream supplied from the disk drive 152, and outputs the HDR video data obtained by decoding to the external output unit 158.

Furthermore, the decoding processing unit 156 decodes the audio stream multiplexed with the AV stream, and outputs the audio data obtained by decoding to the external output unit 158. Although the description mainly deals with video reproduction, the HDR content reproduced by the reproduction apparatus 101 also includes audio data.

The operation input unit 157 includes an input device such as a button or a touch panel, and a receiving unit that receives a signal such as infrared rays transmitted from a remote controller. The operation input unit 157 detects a user operation and supplies a signal indicating the content of the detected operation to the controller 151.

The external output unit 158 is an interface for external output such as HDMI. The external output unit 158 communicates with the TV 102 via the HDMI cable, acquires information associated with the performance of the display included in the TV 102, and outputs the information to the controller 151. Furthermore, the external output unit 158 receives the HDR video data supplied from the decoding processing unit 156, and outputs the data to the TV 102. The external output unit 158 functions as a receiving unit that receives the HDR video data stream supplied from the decoding processing unit 156.

Figure 21:
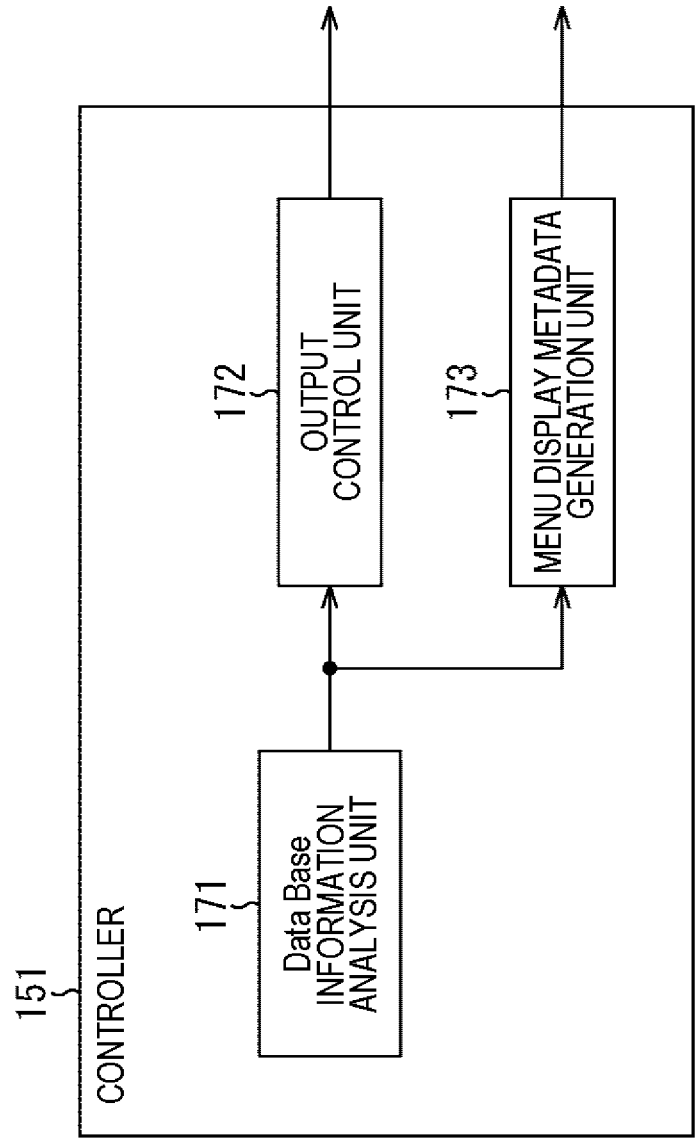
FIG. 21 is a block diagram illustrating a functional configuration example of a controller of FIG. 20.

FIG. 21 is a block diagram illustrating a functional configuration example of the controller 151.

In the controller 151, a Data Base information analysis unit 171, an output control unit 172, and a menu display metadata generation unit 173 are achieved. At least a part of the functional units illustrated in FIG. 21 is achieved when a predetermined program is executed by the CPU of the controller 151.

The Data Base information analysis unit 171 analyzes the Data Base information supplied from the disk drive 152.

For example, the Data Base information analysis unit 171 analyzes the PlayList and reproduces the HDR content according to the description of the PlayList. Furthermore, the Data Base information analysis unit 171 refers to the value of Fixed_Dynamic_metadata_during_PopUp_flag included in the PlayList, specifies metadata used for luminance adjustment while displaying the menu, and outputs information of the specified metadata to the output control unit 172.

The output control unit 172 controls the output of the HDR content by controlling the decoding processing unit 156 and the external output unit 158.

For example, the output control unit 172 causes the decoding processing unit 156 to decode the HDR video stream. Furthermore, the output control unit 172 controls the external output unit 158 to add Dynamic metadata to each picture obtained by decoding the HDR video stream and to output the picture.

In a case where the display of the menu is instructed, the output control unit 172 causes the decoding processing unit 156 to decode the HDR video stream and the ID stream, and combines the menu image obtained by decoding the ID stream to each picture of the HDR video.

The output control unit 172 controls the external output unit 158. In a case where the value of Fixed_Dynamic_metadata_during_PopUp_flag is 0b, the output control unit 172 adds Dynamic metadata to each picture combined with the menu image and outputs the picture. Furthermore, in a case where the value of Fixed_Dynamic_metadata_during_PopUp_flag is 1b, the output control unit 172 adds menu display metadata to each picture combined with the menu image and outputs the picture.

For example, in a case where Fixed_Dynamic_metadata_during_PopUp_flag is included in the PlayList, the menu display metadata generation unit 173 generates menu display metadata by setting a fixed value as the value of each parameter. The menu display metadata generation unit 173 has information of a fixed value set for each parameter. The menu display metadata generation unit 173 outputs the generated menu display metadata to the memory 153, and stores it in the menu display metadata storage unit 153A.

The menu display metadata may be generated in the reproduction apparatus 101 in this way. Furthermore, the menu display metadata may be stored in the menu display metadata storage unit 153A at a timing such as when the reproduction apparatus 101 is manufactured, and may be prepared in the reproduction apparatus 101 in advance.

A value to be set for each parameter of the menu display metadata may be specified by the user. In this case, the value of each parameter is set using, for example, the setting screen of the reproduction apparatus 101. Furthermore, the user may be able to select whether to refer to or ignore the menu display metadata on the TV 102 side using the setting screen of the TV 102.

Furthermore, a value set for each parameter of the menu display metadata may be acquired from the server.

In this case, the server prepares, for example, information of a value to be set for each parameter of the menu display metadata in association with the HDR content recorded on the optical disc 111. The menu display metadata generation unit 173 generates the menu display metadata for the HDR content recorded on the optical disc 111 by setting the value acquired from the server as the value of each parameter.

Furthermore, the menu display metadata may be downloaded from the server. The menu display metadata downloaded and received by the communication unit 155 is output to the memory 153 and stored in the menu display metadata storage unit 153A.

Figure 22:
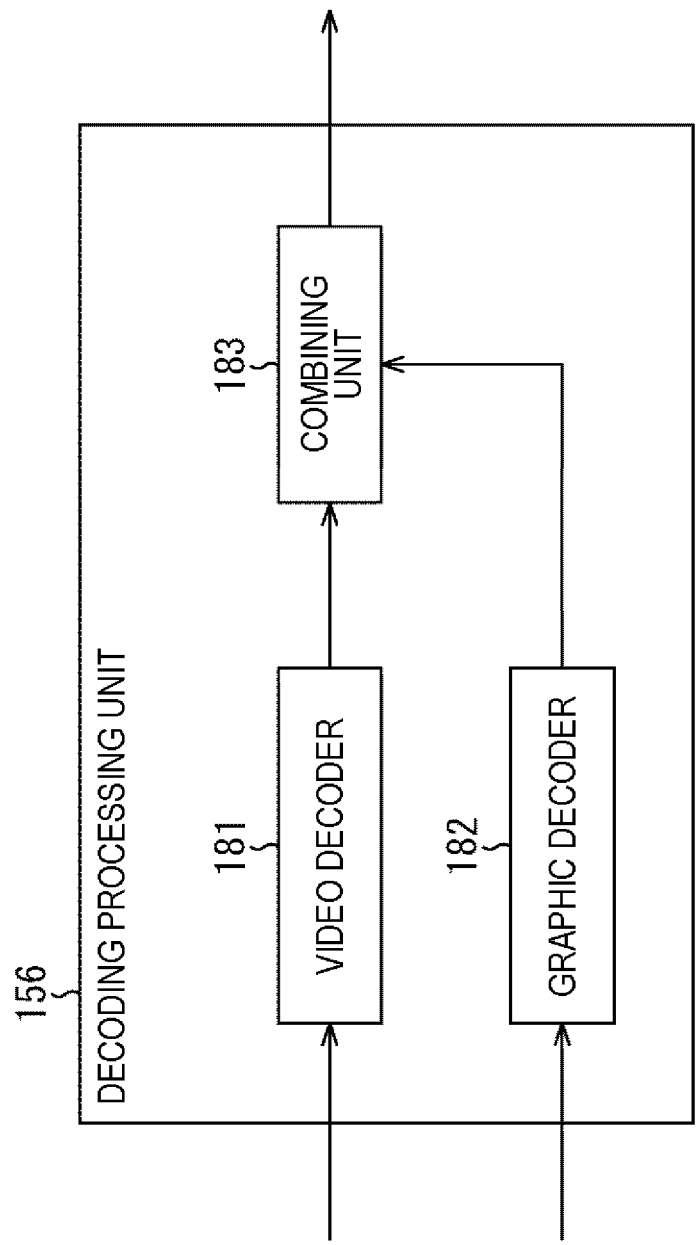
FIG. 22 is a block diagram illustrating a configuration example of a decoding processing unit of FIG. 20.

FIG. 22 is a block diagram illustrating a configuration example of the decoding processing unit 156.

The decoding processing unit 156 includes a video decoder 181, a graphic decoder 182, and a combining unit 183. The HDR video stream included in the AV stream read by the disk drive 152 is input to the video decoder 181, and the IG stream is input to the graphic decoder 182.

The video decoder 181 decodes the HDR video stream and outputs each picture of the HDR video to the combining unit 183. Furthermore, the video decoder 181 acquires Dynamic metadata by decoding the HDR video stream, and outputs the Dynamic metadata to the controller 151.

In a case where the display of the menu is instructed by the user, the graphic decoder 182 decodes the IG stream and outputs the menu image to the combining unit 183.

In the case of displaying the menu, the combining unit 183 combines the menu image supplied from the graphic decoder 182 with each picture of the HDR video supplied from the video decoder 181 and outputs each picture of the HDR video to the external output unit 158. In a case where the menu is not displayed, the combining unit 183 outputs each picture of the HDR video supplied from the video decoder 181 to the external output unit 158 as it is.

Note that, as described above, in addition to the menu, subtitles, OSDs, and the like are also displayed over the HDR video.

For example, in the case of displaying subtitles, the PG stream is decoded by the graphic decoder 182. The subtitle information obtained by decoding the PG stream is supplied to the combining unit 183, and is combined with each picture of the HDR video.

Furthermore, in the case of displaying an OSD, the controller 151 supplies the combining unit 183 with OSD data that is data used for displaying the OSD. The controller 151 is also provided with a functional unit that generates OSD data according to a user operation or the like. In the combining unit 183, the OSD data supplied from the controller 151 is combined with each picture of the HDR video.

<5-3. Operation of the Reproduction Apparatus>

Next, with reference to the flowcharts of FIGS. 23 and 24, the processing of the reproduction apparatus 101 that reproduces the HDR content will be described.

Figure 23:
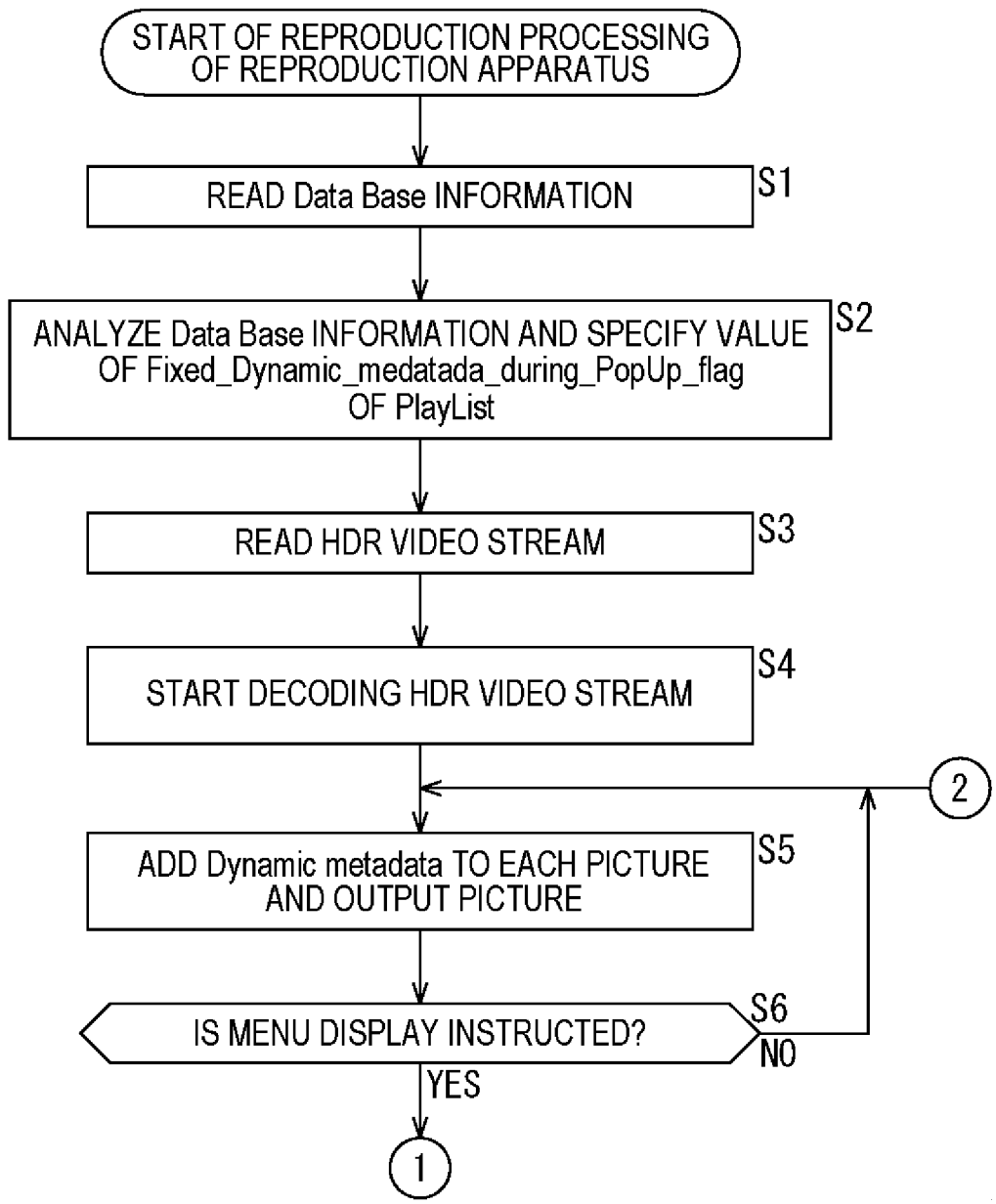
FIG. 23 is a flowchart explaining reproduction processing of a reproduction apparatus.
Figure 24:
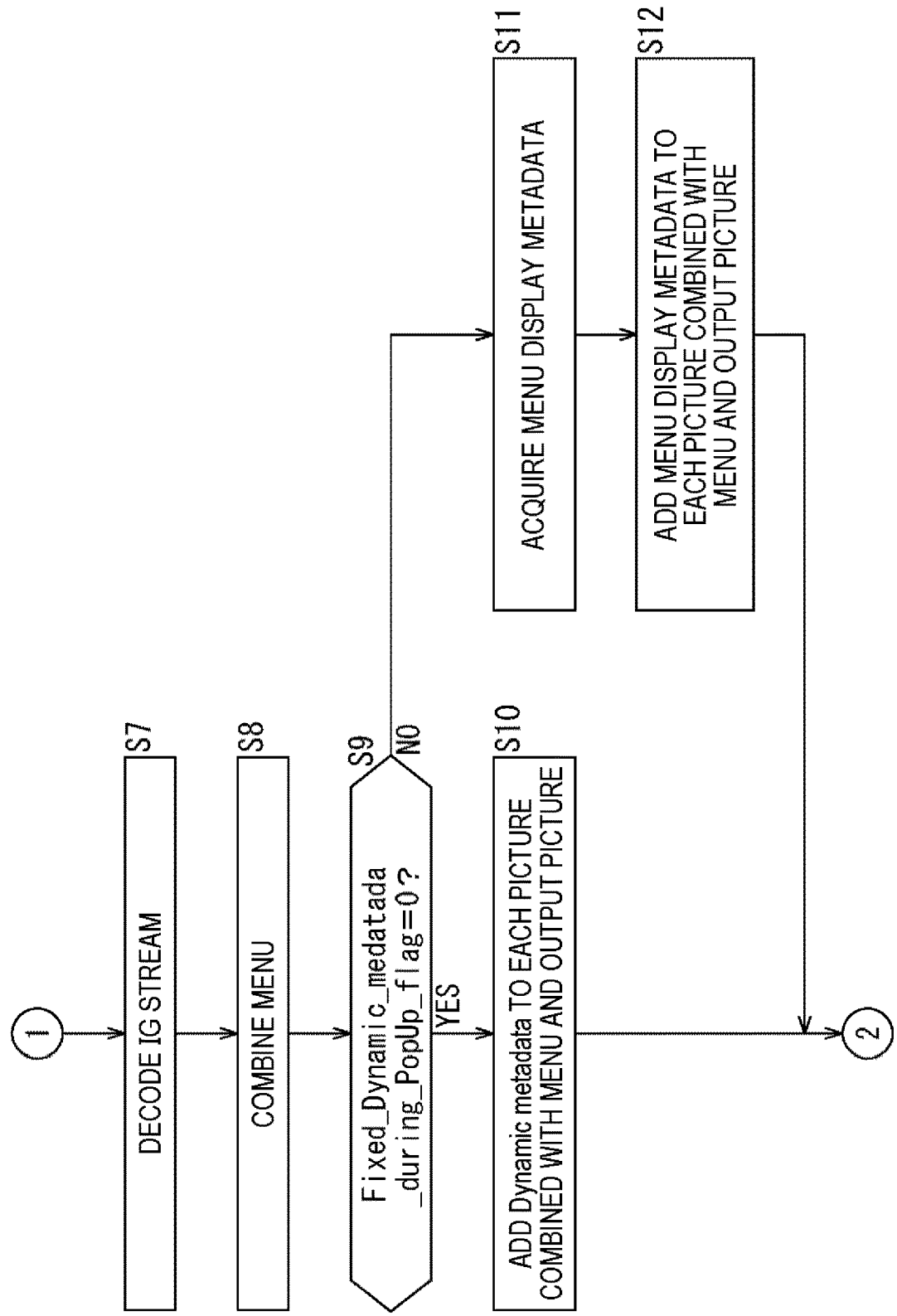
FIG. 24 is a flowchart explaining reproduction processing of the reproduction apparatus, subsequent to FIG. 23.

The processing in FIGS. 23 and 24 is started, for example, when the optical disc 111 is mounted on the disk drive 152 of the reproduction apparatus 101 and reproduction of the HDR content is instructed.

In step S1, the disk drive 152 reads a file of Data Base information including a PlayList file from the optical disc 111.

In step S2, the Data Base information analysis unit 171 of the controller 151 analyzes the PlayList file and specifies an AV stream to be reproduced, for example. Furthermore, the Data Base information analysis unit 171 specifies the value of Fixed_Dynamic_metadata_during_PopUp_flag described in stream_attributes ( ) regarding the IG stream in the STN_table ( ) of the PlayList file.

In step S3, the disk drive 152 reads an AV stream file including the HDR video stream to be reproduced from the optical disc 111.

In step S4, the video decoder 181 of the decoding processing unit 156 decodes the HDR video stream included in the AV stream supplied from the disk drive 152, and outputs the data of each picture to the external output unit 158 via the combining unit 183. The Dynamic metadata included in the HDR video stream is supplied from the video decoder 181 to the controller 151.

In step S5, the external output unit 158 adds the Dynamic metadata supplied from the controller 151 to each picture of the HDR video supplied from the decoding processing unit 156, and outputs the pictures to the TV 102.

In step S6, the output control unit 172 of the controller 151 determines whether or not a menu display has been instructed. In a case where it is determined in step S6 that the menu display has not been instructed, the processing returns to step S5, and the output of each picture of the HDR video is continued.

On the other hand, in a case where it is determined in step S6 that menu display has been instructed, the graphic decoder 182 decodes the IG stream and outputs a menu image to the combining unit 183 in step S7.

In step S8, the combining unit 183 combines the menu image supplied from the graphic decoder 182 with each picture of the HDR video supplied from the video decoder 181 and outputs each picture of the HDR video to the external output unit 158.

In step S9, the output control unit 172 determines whether or not the value of Fixed_Dynamic_metadata_during_PopUp_flag is 0b.

In a case where it is determined in step S9 that the value of Fixed_Dynamic_metadata_during_PopUp_flag is 0b, in step S10, the output control unit 172 controls the external output unit 158, adds Dynamic metadata to each picture combined with the menu image, and outputs the pictures.

In the TV 102, luminance compression of each picture of the HDR video combined with the menu image is performed on the basis of the Dynamic metadata, and the HDR video after the luminance compression is displayed.

On the other hand, in a case where it is determined in step S9 that the value of Fixed_Dynamic_metadata_during_PopUp_flag is 1b, in step S11, the output control unit 172 reads and acquires the menu display metadata from the menu display metadata storage unit 153A. The output control unit 172 outputs the acquired menu display metadata to the external output unit 158.

In step S12, the output control unit 172 controls the external output unit 158 to add display metadata to each picture combined with the menu image, and output the pictures.

In the TV 102, the luminance compression of each picture of the HDR video combined with the menu image is performed on the basis of the menu display metadata, and the HDR video after the luminance compression is displayed.

The processing in step S10 or step S12 is continued until the menu display ends. In a case where the menu display ends, the processing returns to step S5, and the subsequent processing is repeated.

Through the above processing, while the menu is displayed, the reproduction apparatus 101 can transmit the metadata specified by the value of Fixed_Dynamic_metadata_during_PopUp_flag to the TV 102 and perform the luminance adjustment.

The creator of the content can specify, by the value of Fixed_Dynamic_metadata_during_PopUp_flag, the metadata: the Dynamic metadata or the menu display metadata that does not make the appearance of the HDR video or the menu after luminance adjustment unnatural.

The content creator sets the value of Fixed_Dynamic_metadata_during_PopUp_flag so that the luminance adjustment using the Dynamic metadata is performed, for example, in the case of giving priority to the luminance of the HDR video when an image such as the button displayed as a menu is small.

Furthermore, the content creator sets the value of Fixed_Dynamic_metadata_during_PopUp_flag so that the luminance is adjusted using the menu display metadata in the case of giving priority to the luminance of the menu when there are many scenes in which the luminance changes greatly.

By specifying appropriate metadata in this way, the content creator can prevent an unnatural change in luminance in a case where other information such as a menu is superimposed and displayed on the HDR video.

«6. Second Embodiment: Example of Describing a Flag in IG Stream»

Fixed_Dynamic_metadata_during_PopUp_flag may be described in a region other than the PlayList.

Here, the case where Fixed_Dynamic_metadata_during_PopUp_flag is described in the IG stream will be described.

A PES packet constituting the IG stream stores data in units called segments. The menu is displayed using the segments of the menu data.

Figure 25:
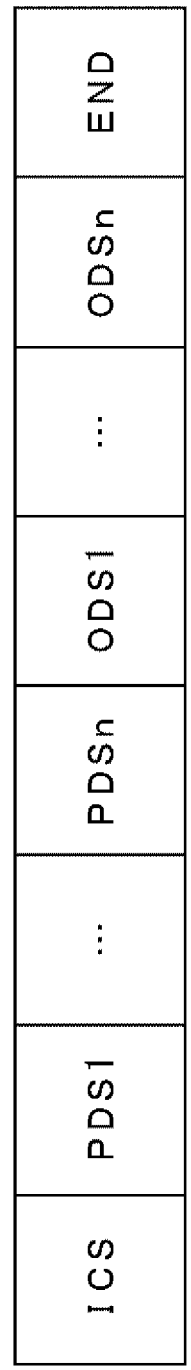
FIG. 25 is a diagram illustrating an example of a display set.

FIG. 25 is a diagram illustrating an example of display set including segments of menu data.

As illustrated in FIG. 25, the display set of menu data includes ICS, PDS1 to PDSn, ODS1 to ODSn, and END Segment, which are segments of a menu image (button) for one screen.

The interactive composition segment (ICS) indicates the head of the display set, and is a segment including attribute information about the menu such as an ID for each menu button.

The palette definition segment (PDS) is a segment including information of colors that can be used as menu color.

The object definition segment (ODS) is a segment including information indicating the shape of the menu.

The END Segment is a segment indicating the end of the display set.

Figure 26:
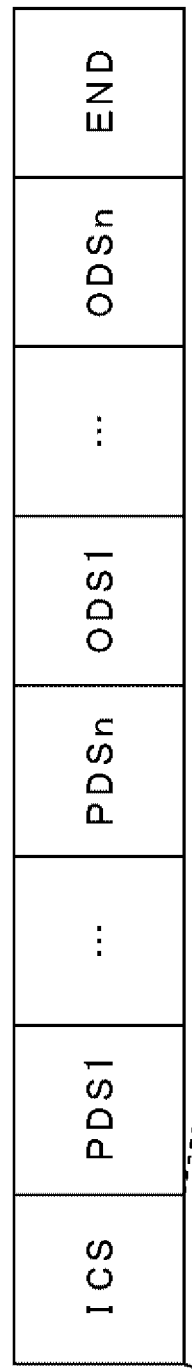
FIG. 26 is a diagram illustrating the syntax of ICS.

FIG. 26 is a diagram illustrating the syntax of the ICS.

The ICS describes segment_descriptor ( ), video_descriptor ( ), composition_descriptor ( ), sequence_descriptor ( ), and interactive_composition_data_fragment ( ). The term interactive_composition_data_fragment ( ) includes interactive_composition ( ).

FIG. 27 is a diagram illustrating the syntax of interactive_composition ( ) included in interactive_composition_data_fragment ( ).

As illustrated in FIG. 27, in interactive_composition ( ), stream_model and user_interface_model are described. The term stream_model indicates a multiplexing method of ICS and related information. The term user_interface_model indicates whether the menu is displayed in a Pop-Up format or an Always-On format.

Furthermore, in the interactive_composition ( ), Fixed_Dynamic_metadata_during_PopUp_flag is described.

In this way, Fixed_Dynamic_metadata_during_PopUp_flag can be described in interactive_composition ( ) of the ICS constituting the IG stream.

The processing using Fixed_Dynamic_metadata_during_PopUp_flag described in the IG stream is basically similar to the processing in a case where Fixed_Dynamic_metadata_during_PopUp_flag is described in the PlayList.

That is, when decoding the IG stream, the graphic decoder 182 outputs the information of Fixed_Dynamic_metadata_during_PopUp_flag to the controller 151. As described above, the output control unit 172 of the controller 151 switches the metadata output together with each picture of the HDR video on the basis of the value of Fixed_Dynamic_metadata_during_PopUp_flag.

In this way, the reproduction apparatus 101 can also transmit the metadata specified by the value of Fixed_Dynamic_metadata_during_PopUp_flag to the TV 102 and perform the luminance adjustment.

The PG stream, which is a subtitle stream, has the configuration similar to that of the IG stream. Fixed_Dynamic_metadata_during_PopUp_flag may be described in the PG stream.

As described above, Fixed_Dynamic_metadata_during_PopUp_flag can be described in a graphic stream (IG stream, PG stream).

«7. Configuration and Operation of Other Apparatuses»

<7-1. Configuration and Operation of the TV 102>

Figure 28:
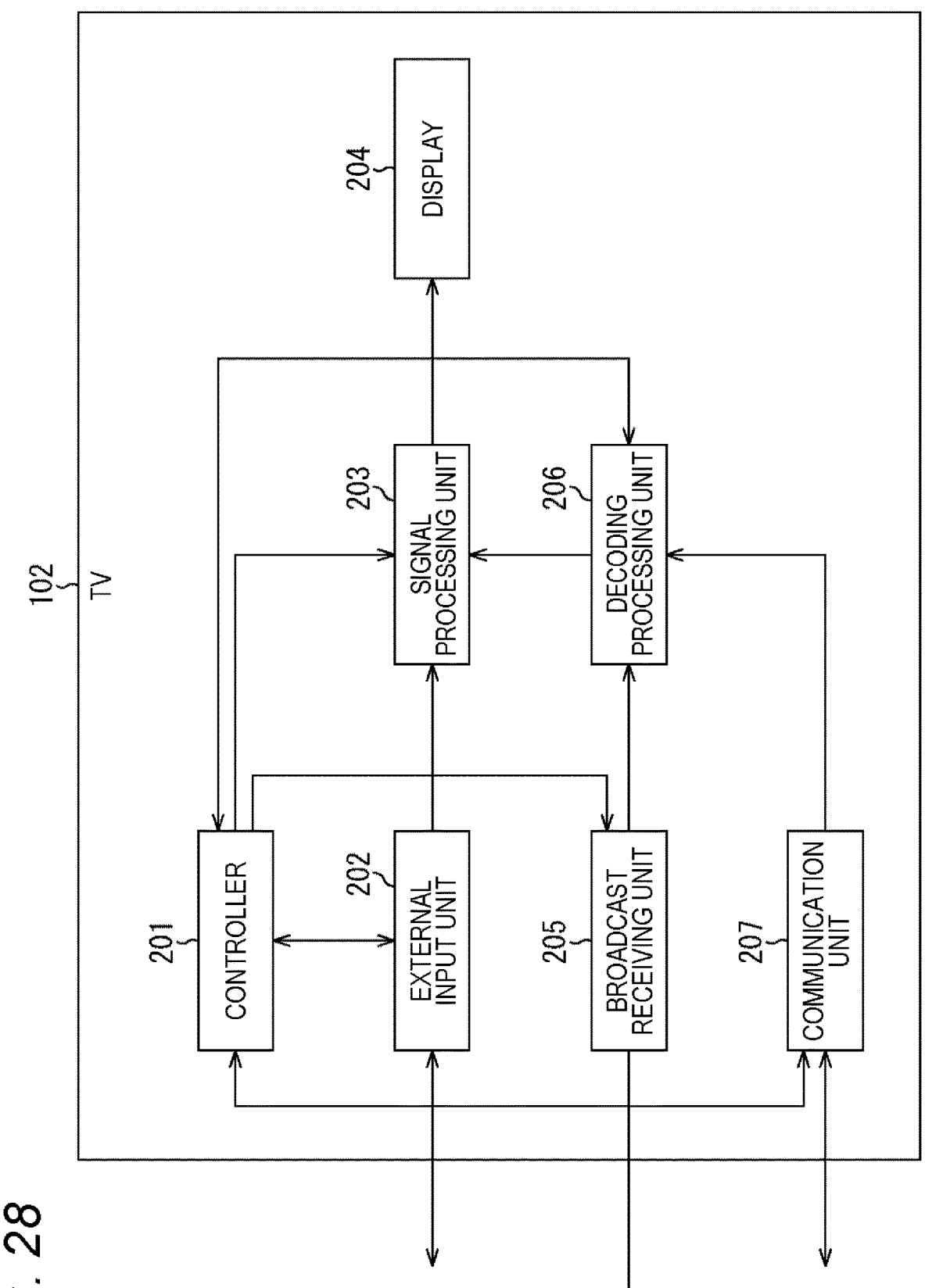
FIG. 28 is a block diagram illustrating a configuration example of a TV.

FIG. 28 is a block diagram illustrating a configuration example of the TV 102.

The TV 102 includes a controller 201, an external input unit 202, a signal processing unit 203, a display 204, a broadcast receiving unit 205, a decoding processing unit 206, and a communication unit 207.

The controller 201 includes a CPU, a ROM, a RAM, and the like. The controller 201 executes a predetermined program and controls the overall operation of the TV 102.

For example, the controller 201 manages information indicating the performance of the display 204. The controller 201 outputs information indicating the performance of the display 204 to the external input unit 202 and transmits the information to the reproduction apparatus 101 when the HDMI transmission is set.

Furthermore, the controller 201 controls processing of the HDR video by the signal processing unit 203. For example, the controller 201 causes the signal processing unit 203 to perform luminance compression of the HDR video on the basis of the Dynamic metadata or the menu display metadata transmitted from the reproduction apparatus 101 when the HDR content is reproduced.

The external input unit 202 is an interface for external input such as HDMI. The external input unit 202 communicates with the reproduction apparatus 101 via the HDMI cable, receives data of each picture of the HDR video transmitted from the reproduction apparatus 101, and outputs the data to the signal processing unit 203. Furthermore, the external input unit 202 receives the Dynamic metadata or the menu display metadata transmitted in addition to each picture of the HDR video, and outputs the received metadata to the controller 201.

The signal processing unit 203 processes the HDR video supplied from the external input unit 202 and causes the display 204 to display a video. The signal processing unit 203 appropriately compresses the luminance of the HDR video under the control of the controller 201 so that the luminance falls within a range that can be displayed on the display 204.

The signal processing unit 203 also performs, for example, processing for displaying the video of the program on the display 204 on the basis of the data supplied from the decoding processing unit 206.

The display 204 is a display device such as an organic electroluminescence (EL) display or a liquid crystal display (LCD). The display 204 displays the video of the HDR content or the video of the program on the basis of the video signal supplied from the signal processing unit 203.

The broadcast receiving unit 205 extracts a broadcast signal of a predetermined channel from the signal supplied from the antenna, and outputs the signal to the decoding processing unit 206. The extraction of the broadcast signal by the broadcast receiving unit 205 is performed under the control of the controller 201.

The decoding processing unit 206 performs processing such as decoding on the broadcast signal supplied from broadcast receiving unit 205, and outputs video data of the program to the signal processing unit 203.

The communication unit 207 is an interface such as a wireless LAN and a wired LAN. The communication unit 207 communicates with the server via the Internet.

The processing of displaying the TV 102 will be described with reference to the flowchart in FIG. 29.

Figure 29:
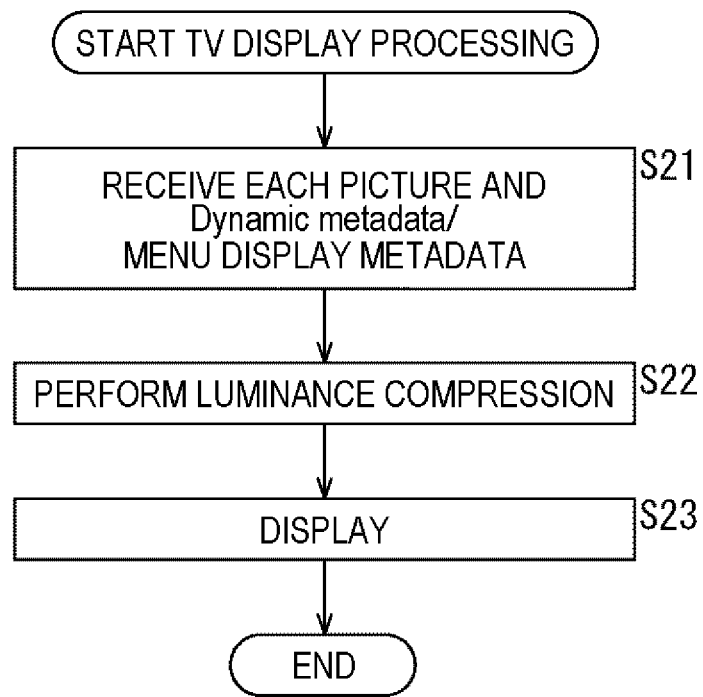
FIG. 29 is a flowchart explaining TV display processing.

The processing in FIG. 29 is performed when transmission of a picture obtained by decoding an HDR video stream is started. The Dynamic metadata or the menu display metadata is added to the picture transmitted from the reproduction apparatus 101.

In step S21, the external input unit 202 of the TV 102 receives the data of each picture of the HDR content transmitted from the reproduction apparatus 101 and the Dynamic metadata or the menu display metadata transmitted in addition to the data.

In a case where the menu display is not instructed, or in a case where the menu display is instructed but the value of Fixed_Dynamic_metadata_during_PopUp_flag is 0b, each picture and the Dynamic metadata are received here.

Furthermore, in a case where the display of the menu is instructed in the reproduction apparatus 101 and the value of Fixed_Dynamic_metadata_during_PopUp_flag is 1b, each picture and the menu display metadata are received here.

The data of each picture received by the external input unit 202 is supplied to the signal processing unit 203, and the metadata (Dynamic metadata or display metadata) is supplied to the controller 201.

In step S22, the signal processing unit 203 performs luminance compression of each picture of the HDR video under the control of the controller 201. In a case where the metadata transmitted with each picture is the Dynamic metadata, luminance compression is performed on the basis of the Dynamic metadata. Furthermore, in a case where the metadata transmitted with each picture is the menu display metadata, luminance compression is performed on the basis of the menu display metadata.

In step S23, the signal processing unit 203 causes the display 204 to display the HDR video subjected to the luminance compression. The display of the HDR video is continued until the reproduction of the HDR content ends.

<7-2. Configuration and Operation of the Recording Apparatus>

Figure 30:
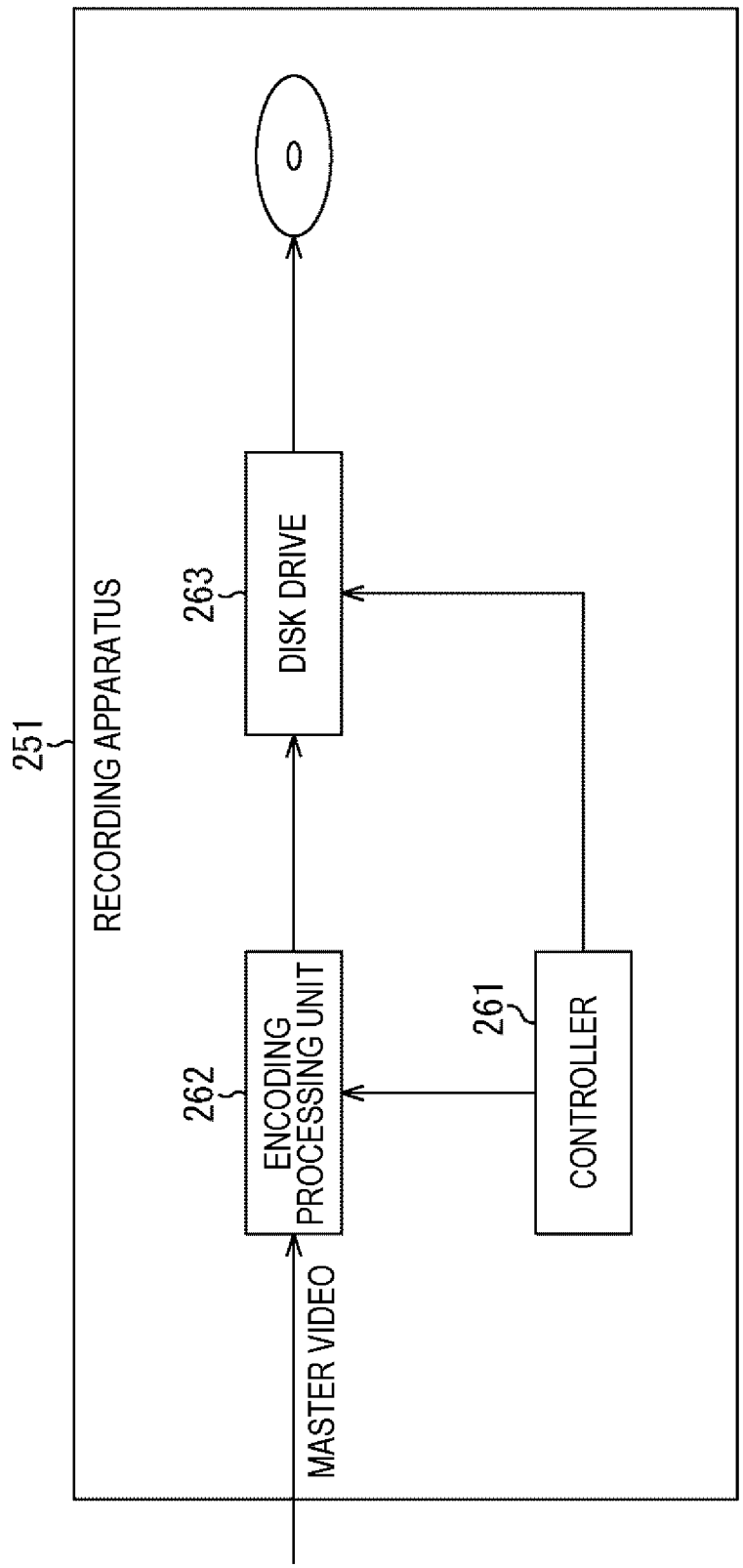
FIG. 30 is a block diagram illustrating a configuration example of a recording apparatus.

FIG. 30 is a block diagram illustrating a configuration example of a recording apparatus 251.

The optical disc 111, which is a BD as described above, is created in the recording apparatus 251 of FIG. 30.

The recording apparatus 251 includes a controller 261, an encoding processing unit 262, and a disk drive 263. The master video is input to the encoding processing unit 262.

The controller 261 includes a CPU, a ROM, a RAM, and the like. The controller 261 executes a predetermined program and controls the overall operation of the recording apparatus 251.

The encoding processing unit 262 performs encoding of the master video and generates an HDR video stream. The Dynamic metadata added to each picture when the HDR video stream is generated and encoded as an SEI message is supplied from the controller 261.

Furthermore, the encoding processing unit 262 generates an IG stream by encoding a menu image, and generates a PG stream by encoding subtitle data. Information such as a menu image and subtitle data is also input to the encoding processing unit 262.

The encoding processing unit 262 multiplexes the HDR video stream, the IG stream, and the PG stream obtained by performing the encoding with the audio stream and the like, thereby generating an AV stream constituting a Clip. The encoding processing unit 262 outputs the generated AV stream to the disk drive 263.

The disk drive 263 records each file of the Data Base information supplied from the controller 261 and the file of the AV stream supplied from the encoding processing unit 262 on the optical disc 111 according to the directory structure of FIG. 14.

Figure 31:
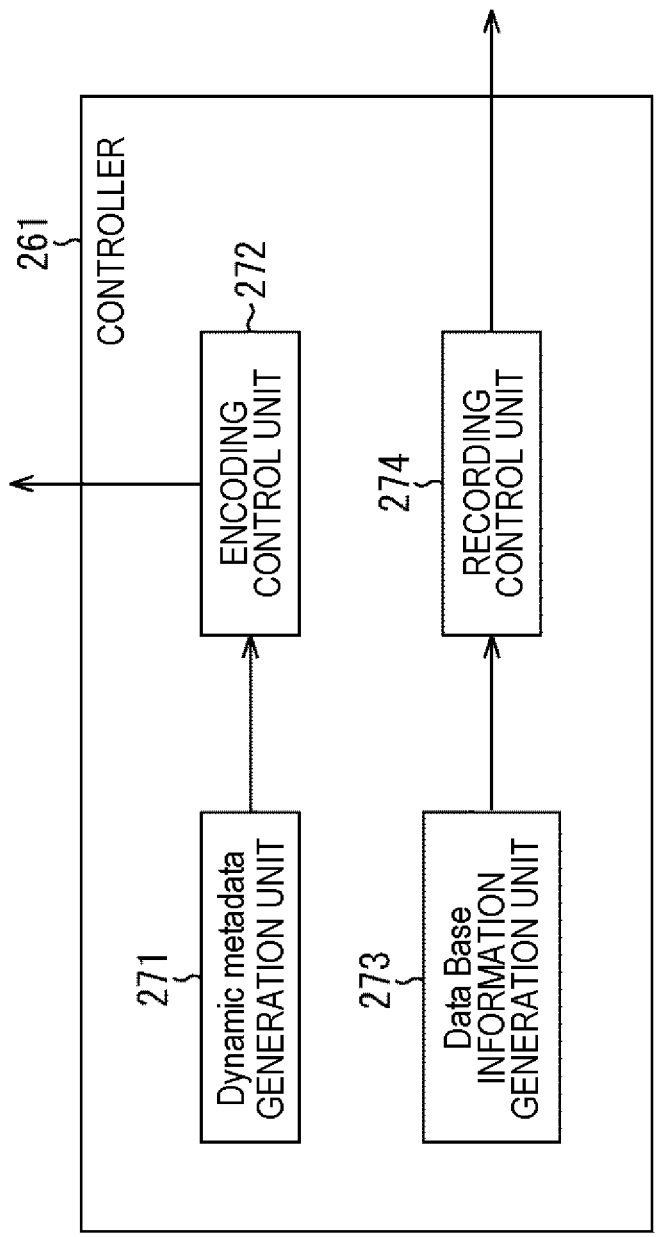
FIG. 31 is a block diagram illustrating a functional configuration example of a controller of FIG. 30.

FIG. 31 is a block diagram illustrating a functional configuration example of the controller 261.

In the controller 261, a Dynamic metadata generation unit 271, an encoding control unit 272, a Data Base information generation unit 273, and a recording control unit 274 are achieved. At least a part of the functional units illustrated in FIG. 31 is achieved when a predetermined program is executed by the CPU of the controller 261.

The Dynamic metadata generation unit 271 sets a value of each parameter according to input by the content creator and generates Dynamic metadata. The Dynamic metadata generation unit 271 outputs the generated Dynamic metadata to the encoding control unit 272.

The encoding control unit 272 outputs the Dynamic metadata generated by the Dynamic metadata generation unit 271 to the encoding processing unit 262, and causes each picture of the HDR video to be encoded. Furthermore, the encoding control unit 272 causes the encoding processing unit 262 to encode the menu data and the subtitle data.

Note that in a case where Fixed_Dynamic_metadata_during_PopUp_flag is described in the graphic stream, the encoding control unit 272 outputs the information of Fixed_Dynamic_metadata_during_PopUp_flag to the encoding processing unit 262, and causes the encoding processing unit 262 to encode menu data and subtitle data.

The Data Base information generation unit 273 generates Data Base information such as an Index table, a PlayList, and Clip Information.

For example, the Data Base information generation unit 273 sets a value of Fixed_Dynamic_metadata_during_PopUp_flag according to input by the content creator, and generates a PlayList including Fixed_Dynamic_metadata_during_PopUp_flag.

The Data Base information generation unit 273 outputs the generated Data Base information file to the recording control unit 274.

The recording control unit 274 outputs the file of the Data Base information generated by the Data Base information generation unit 273 to the disk drive 263 and records the file on the optical disc 111.

The recording processing of the recording apparatus 251 having the above configuration will be described with reference to the flowchart of FIG. 32.

Figure 32:
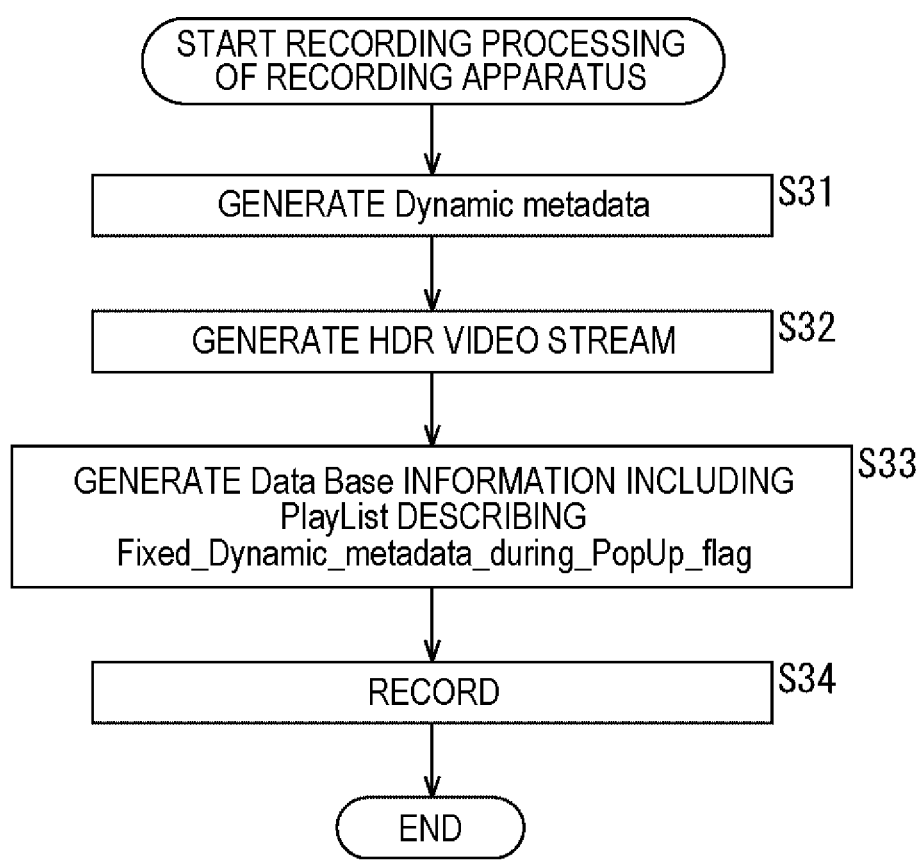
FIG. 32 is a flowchart explaining recording processing of a recording apparatus.

The processing in FIG. 32 is started, for example, when master video data is input.

In step S31, the Dynamic metadata generation unit 271 of the controller 261 sets a value of each parameter according to input by the content creator, and generates Dynamic metadata.

In step S32, the encoding processing unit 262 performs encoding of the master video to generate an HDR video stream. Furthermore, the encoding processing unit 262 encodes a menu image and subtitle data to generate an IG stream and a PG stream. The encoding processing unit 262 generates an AV stream by multiplexing the generated streams.

In step S33, the Data Base information generation unit 273 generates Data Base information such as a PlayList including Fixed_Dynamic_metadata_during_PopUp_flag.

In step S34, the disk drive 263 generates the optical disc 111 by recording the Data Base information file supplied from the controller 261 and the AV stream file supplied from the encoding processing unit 262. Thereafter, the processing ends.

Through the above processing, the recording apparatus 251 can generate the optical disc 111 on which the PlayList including Fixed_Dynamic_metadata_during_PopUp_flag is recorded.

«8. Other Configuration Example of the Reproduction System»

<8-1. First Configuration Example>

Although the case where the HDR content is recorded on the optical disc 111 has been described, the above processing can also be applied to the case where the HDR content distributed via the network is reproduced.

Figure 33:
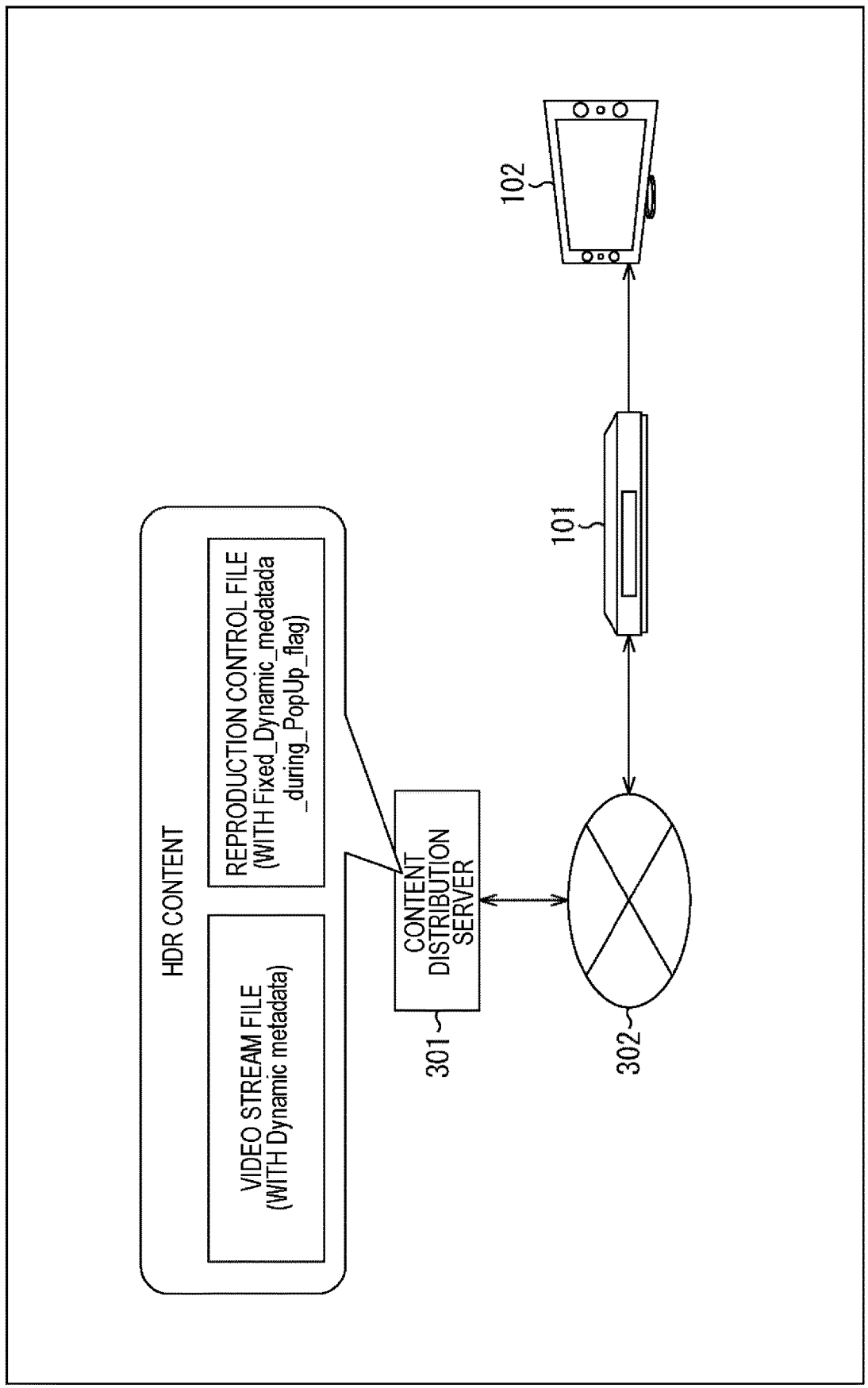
FIG. 33 is a diagram illustrating a configuration example of another reproduction system for HDR content.

FIG. 33 is a diagram illustrating a configuration example of another reproduction system of the HDR content.

The reproduction system in FIG. 33 is configured by connecting the reproduction apparatus 101 and a content distribution server 301 via a network 302 such as the Internet. The TV 102 is connected to the reproduction apparatus 101 via an HDMI cable or the like. The video of the HDR content reproduced by the reproduction apparatus 101 is displayed on the TV 102.

The content distribution server 301 is a server managed by a business operator that provides an HDR content distribution service. As illustrated in the balloon in FIG. 33, the content distributed by the content distribution server 301 is HDR content.

Each HDR content is configured by associating an HDR video stream file including Dynamic metadata with a file of reproduction control information. The reproduction control information is information described by, for example, XML. The reproduction control information includes information corresponding to Fixed_Dynamic_metadata_during_PopUp_flag.

For example, in a case where the user operates the reproduction apparatus 101 to access the content distribution server 301, the TV 102 displays an HDR content selection screen. The user can select predetermined HDR content and request the content distribution server 301 to start viewing.

In a case where the HDR content is selected, the content distribution server 301 transmits the selected HDR content to the reproduction apparatus 101.

The reproduction apparatus 101 receives the HDR content transmitted from the content distribution server 301, and performs the processing similar to the above-described reproduction processing, thereby reproducing the HDR content.

That is, the Dynamic metadata is transmitted from the reproduction apparatus 101 to the TV 102 together with each picture obtained by decoding the HDR video stream, and luminance compression is performed on the basis of the Dynamic metadata.

Furthermore, in a case where menu display is instructed and the value of Fixed_Dynamic_metadata_during_PopUp_flag is 1b, menu display metadata is transmitted together with each picture of the HDR content, and luminance compression is performed in the TV 102 on the basis of the menu display metadata. The reproduction apparatus 101 has menu display metadata.

As described above, even in a case where the content distributed by the content distribution server 301 is reproduced, the processing using the Fixed_Dynamic_metadata_during_PopUp_flag can be performed.

Figure 34:
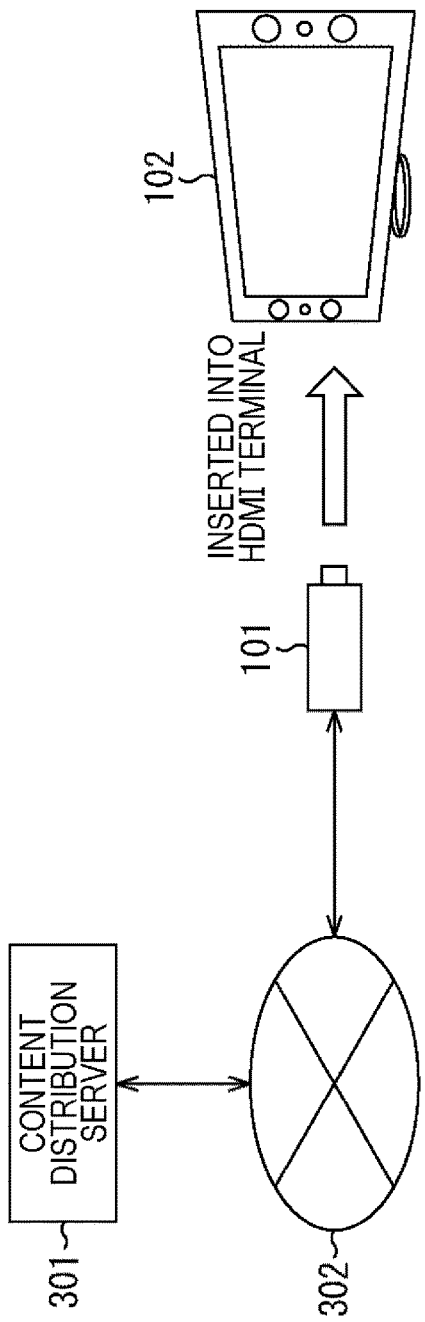
FIG. 34 is a diagram illustrating another configuration example of a reproduction apparatus.

FIG. 34 is a diagram illustrating another configuration example of the reproduction apparatus 101.

As illustrated in FIG. 34, the reproduction apparatus 101 may be a so-called stick type terminal. An HDMI terminal is provided on the housing of the reproduction apparatus 101 illustrated in FIG. 34. The reproduction apparatus 101 and the TV 102 are connected by inserting the HDMI terminal provided in the housing into the HDMI terminal of the TV 102.

In this case, for example, a configuration other than the disk drive 152 in the configuration illustrated in FIG. 20 is provided on the reproduction apparatus 101. The reproduction apparatus 101 reproduces the HDR content distributed by the content distribution server 301 by performing the processing similar to the above-described processing.

As described above, it is possible to adopt various forms as the form of the reproduction apparatus 101. For example, the function of the reproduction apparatus 101 may be mounted on a portable terminal such as a smartphone or a tablet terminal, or the function of the reproduction apparatus 101 may be mounted on a terminal such as a PC.

<8-2. Second Configuration Example>

The function of the reproduction apparatus 101 may be mounted on the TV 102.

FIG. 35 is a diagram illustrating a configuration example of still another reproduction system for HDR content.

The reproduction system in FIG. 35 is configured by connecting the TV 102 having the function of the reproduction apparatus 101 and the content distribution server 301 via the network 302. Duplicate descriptions will be omitted as appropriate.

The TV 102 displays an HDR content selection screen on the basis of the information transmitted from the content distribution server 301.

In a case where a predetermined HDR content is selected by the user, the content distribution server 301 transmits the selected HDR content to the TV 102.

The TV 102 receives the HDR content transmitted from the content distribution server 301 and reproduces the HDR content.

That is, the TV 102 performs luminance compression of each picture of the HDR video on the basis of the Dynamic metadata.

Furthermore, in a case where menu display is instructed and the value of Fixed_Dynamic_metadata_during_PopUp_flag is 1b, the TV 102 performs luminance compression of each picture of the HDR video on the basis of the menu display metadata. The TV 102 is provided with menu display metadata.

As described above, the function of the reproduction apparatus 101 may be provided in the TV 102, and the TV 102 may perform the processing using the Fixed_Dynamic_metadata_during_PopUp_flag described above.

«9. Other Examples»

Although the recording medium on which the HDR content is recorded is an optical disc, another recording medium such as a flash memory may be used.

The Fixed_Dynamic_metadata_during_PopUp_flag is described in the PlayList or the graphic stream, but may be described in other information such as Clip Information.

The processing performed on the video on the basis of the Dynamic metadata or the menu display metadata is the luminance compression, but the luminance decompression may be performed in the TV 102. In this case, information of a tone curve used for luminance decompression is described in the Dynamic metadata or the menu display metadata.

Although the video stream input to the reproduction apparatus 101 is assumed to be a video stream encoded by a predetermined method, a video stream that includes a picture with the Dynamic metadata added thereto and is not encoded may be input to the reproduction apparatus 101.

<Computer Configuration Example>

The series of processing described above can be executed by hardware and it can also be executed by software. In a case where a series of processing is executed by software, a program constituting the software is installed from a program recording medium into a computer incorporated in dedicated hardware, a general-purpose personal computer, or the like.

FIG. 36 is a block diagram illustrating a configuration example of hardware of a computer in which the series of processing described above is executed by a program.

A central processing unit (CPU) 1001, a read only memory (ROM) 1002, a random access memory (RAM) 1003 are interconnected by a bus 1004.

An input/output interface 1005 is further connected to the bus 1004. The input/output interface 1005 is connected to an input unit 1006 including a keyboard, a mouse, and the like, and an output unit 1007 including a display, a speaker, and the like. Furthermore, the input/output interface 1005 is connected to a storage unit 1008 such as a hard disk or a non-volatile memory, a communication unit 1009 such as a network interface, and a drive 1010 for driving a removable medium 1011.

In the computer configured in the manner described above, the series of processing described above is performed, for example, such that the CPU 1001 loads the program stored in the storage unit 1008 into the RAM 1003 via the input/output interface 1005 and the bus 1004 and executes the program.

The program executed by the CPU 1001 is recorded on, for example, the removable medium 1011 or provided via a wired or wireless transmission medium such as a local area network, the Internet, or digital broadcasting, and is installed in the storage unit 1008.

Note that the program executed by the computer may be a program that is processed in chronological order along the order described in the present description or may be a program that is processed in parallel or at a required timing, e.g., when call is carried out.

The embodiment of the present technology is not limited to the aforementioned embodiments, but various changes may be made within the scope not departing from the gist of the present technology.

For example, the present technology can adopt a configuration of cloud computing in which one function is shared and jointly processed by a plurality of apparatuses via a network.

Furthermore, each step described in the above-described flowcharts can be executed by a single apparatus or shared and executed by a plurality of apparatuses.

Moreover, in a case where a single step includes a plurality of pieces of processing, the plurality of pieces of processing included the single step can be executed by a single device or can be shared and executed by a plurality of devices.

In the present description, a system means a cluster of a plurality of constituent elements (apparatuses, modules (parts), etc.) and it does not matter whether or not all the constituent elements are in the same casing. Therefore, a plurality of apparatuses that is housed in different casings and connected by network, and a single apparatus in which a plurality of modules is housed in a single casing are both the system.

The effects described in the present description are merely illustrative and are not limitative, and other effects may be provided.

<Example of Configuration Combination>

The present technology may adopt the configuration described below.

(1)

A reproduction apparatus including:

a receiving unit configured to receive a video stream to which dynamic metadata including luminance information of a picture is added; and an output control unit configured, in a case where predetermined information is superimposed and displayed on the picture, to add metadata indicated by a flag indicating the metadata used for luminance adjustment while the predetermined information is superimposed and displayed to the picture constituting the received video stream, and output the picture to which the metadata has been added to a display apparatus.

(2)

The reproduction apparatus according to (1), further including:

a decoding unit that decodes the video stream, in which the output control unit adds the metadata to the picture obtained by decoding the video stream.

(3)

The reproduction apparatus according to (1), in which the video stream is an HDR video stream.

(4)

The reproduction apparatus according to any of (1) to (3), in which the flag indicates the dynamic metadata or display metadata that is the metadata for displaying the predetermined information.

(5)

The reproduction apparatus according to (4), in which the output control unit adds the dynamic metadata to each of the pictures in a case where use of the dynamic metadata for the luminance adjustment is indicated by the flag.

(6)

The reproduction apparatus according to (5), in which the output control unit adds the display metadata prepared in the reproduction apparatus to each of the pictures in a case where use of the display metadata for the luminance adjustment is indicated by the flag.

(7)

The reproduction apparatus according to (6), further including:

a metadata generation unit that generates the display metadata by setting a fixed value prepared in advance to a value of each parameter.

(8)

The reproduction apparatus according to any of (1) to (7), further including:

a control unit that analyzes reproduction control information used for reproducing the video stream and specifies a value of the flag described in the reproduction control information.

(9)

The reproduction apparatus according to (8), further including:

a reading unit that reads a file of the reproduction control information and a file of the video stream from a recording medium.

(10)

The reproduction apparatus according to any of (1) to (7), further including:

a control unit that analyzes attribute information constituting a graphic stream transmitting the predetermined information and specifies a value of the flag described in the attribute information.

(11)

The reproduction apparatus according to (10), further including:

a decoding unit that decodes the graphic stream; and a combining unit that combines the predetermined information obtained by decoding the graphic stream with the picture.

(12)

The reproduction apparatus according to (11), further including:

a reading unit that reads a file of the graphic stream and a file of the video stream from a recording medium.

(13)

A reproduction method including:

with a reproduction apparatus, receiving a video stream to which dynamic metadata including luminance information of a picture has been added;

in a case where predetermined information is superimposed and displayed on the picture, adding metadata indicated by a flag indicating the metadata used for luminance adjustment while the predetermined information is superimposed and displayed to the picture constituting the received video stream; and outputting the picture to which the metadata has been added to a display apparatus.

(14)

A program for causing a computer to execute processing of:

receiving a video stream to which dynamic metadata including luminance information of a picture has been added;

in a case where predetermined information is superimposed and displayed on the picture, adding metadata indicated by a flag indicating the metadata used for luminance adjustment while the predetermined information is superimposed and displayed to the picture constituting the received video stream; and outputting the picture to which the metadata has been added to a display apparatus.

(15)

A recording medium recording:

a first file of a video stream to which dynamic metadata including luminance information of a picture has been added; and a second file in which a flag indicating metadata used for luminance adjustment while superimposing and displaying predetermined information on the picture is described.

(16)

The recording medium according to (15), in which the second file is a file of reproduction control information used for reproducing the video stream.

(17)

The recording medium according to (15), in which the second file is a file of a graphic stream transmitting the predetermined information including attribute information in which the flag is described.

(18)

The recording medium according to any of (15) to (17), in which the recording medium is a BD-ROM disc.

REFERENCE SIGNS LIST

101 Reproduction apparatus
102 TV
151 Controller
152 Disk drive
153 Memory
154 Local storage
155 Communication unit
156 Decoding processing unit
157 Operation input unit
158 External output unit
171 Data Base information analysis unit
172 Menu display metadata generation unit
173 Output control unit

The invention claimed is:

1. A reproduction apparatus comprising:
a receiving unit configured to receive a video stream to which dynamic metadata including luminance information of a picture has been added; and
an output control unit configured, in a case where predetermined information is superimposed and displayed on the picture, to
add default metadata indicated by a flag indicating the default metadata used for luminance adjustment while the predetermined information is superimposed and displayed to the picture constituting the received video stream, and
output the picture to which the default metadata has been added to a display apparatus,
wherein the default metadata comprises fixed values for a plurality of parameters of the dynamic metadata, and
wherein the receiving unit and the output control unit are each implemented via at least one processor.

2. The reproduction apparatus according to claim 1, further comprising:
a decoding unit configured to decode the video stream,
wherein the output control unit adds the default metadata to the picture obtained by decoding the video stream, and wherein the decoding unit is implemented via at least one processor.

3. The reproduction apparatus according to claim 1, wherein
the video stream comprises an HDR video stream.

4. The reproduction apparatus according to claim 1, wherein
the flag indicates whether to use the dynamic metadata or the default metadata for displaying the predetermined information.

5. The reproduction apparatus according to claim 4, wherein
the output control unit adds the dynamic metadata to each picture of a plurality of pictures in a case where use of the dynamic metadata for the luminance adjustment is indicated by the flag.

6. The reproduction apparatus according to claim 5, wherein
the output control unit adds the display metadata prepared in the reproduction apparatus to each of the plurality of pictures in a case where use of the display metadata for the luminance adjustment is indicated by the flag.

7. The reproduction apparatus according to claim 6, further comprising:
a metadata generation unit configured to generate the display metadata by setting a fixed value prepared in advance to a value of each parameter of the plurality of parameters,
wherein the metadata generation unit is implemented via at least one processor.

8. The reproduction apparatus according to claim 1, further comprising:
a control unit configured to analyze reproduction control information used for reproducing the video stream and specifies a value of the flag described in the reproduction control information,
wherein the control unit is implemented via at least one processor.

9. The reproduction apparatus according to claim 8, further comprising:
a reading unit configured to read a file of the reproduction control information and a file of the video stream from a recording medium,
wherein the reading unit is implemented via at least one processor.

10. The reproduction apparatus according to claim 1, further comprising:
a control unit configured to analyze attribute information constituting a graphic stream transmitting the predetermined information and specifies a value of the flag described in the attribute information,
wherein the control unit is implemented via at least one processor.

11. The reproduction apparatus according to claim 10, further comprising:
a decoding unit configured to decode the graphic stream; and
a combining unit configured to combine the predetermined information obtained by decoding the graphic stream with the picture,
wherein the decoding unit and the combining unit are each implemented via at least one processor.

12. The reproduction apparatus according to claim 11, further comprising:
a reading unit configured to read a file of the graphic stream and a file of the video stream from a non-transitory computer-readable storage medium,
wherein the reading unit is implemented via at least one processor.

13. A reproduction method comprising:
with a reproduction apparatus,
receiving a video stream to which dynamic metadata including luminance information of a picture has been added;
in a case where predetermined information is superimposed and displayed on the picture, adding default metadata indicated by a flag indicating the default metadata used for luminance adjustment while the predetermined information is superimposed and displayed to the picture constituting the received video stream; and
outputting the picture to which the default metadata has been added to a display apparatus,
wherein the default metadata comprises fixed values for a plurality of parameters of the dynamic metadata.

14. A non-transitory computer-readable storage medium having embodied thereon a program, which when executed by a computer causes the computer to execute a method, the method comprising:
receiving a video stream to which dynamic metadata including luminance information of a picture has been added;
in a case where predetermined information is superimposed and displayed on the picture, adding default metadata indicated by a flag indicating the default metadata used for luminance adjustment while the predetermined information is superimposed and displayed to the picture constituting the received video stream; and
outputting the picture to which the default metadata has been added to a display apparatus,
wherein the default metadata comprises fixed values for a plurality of parameters of the dynamic metadata.

15. A non-transitory computer-readable storage medium having embodied thereon a program, which when executed by a computer causes the computer to execute a method, the method comprising:
recording a first file of a video stream to which dynamic metadata including luminance information of a picture has been added; and
recording a second file in which a flag indicating default metadata used for luminance adjustment while superimposing and displaying predetermined information on the picture is described,
wherein the default metadata comprises fixed values for a plurality of parameters of the dynamic metadata.

16. The non-transitory computer-readable storage medium according to claim 15, wherein
the second file is a file of reproduction control information used for reproducing the video stream.

17. The non-transitory computer-readable storage medium according to claim 15, wherein
the second file is a file of a graphic stream transmitting the predetermined information including attribute information in which the flag is described.

18. The non-transitory computer-readable storage medium according to claim 15, wherein
the non-transitory computer-readable storage medium comprises a BD-ROM disc.

* * * * *